US006932996B2

(12) United States Patent
Huxel

(10) Patent No.: US 6,932,996 B2
(45) Date of Patent: *Aug. 23, 2005

(54) COATED FLAKED FATS

(75) Inventor: Edward T. Huxel, Ft. Worth, TX (US)

(73) Assignee: Cargill, Inc., Wayzata, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/047,579

(22) Filed: Jan. 15, 2002

(65) Prior Publication Data

US 2002/0142072 A1 Oct. 3, 2002

Related U.S. Application Data

(63) Continuation-in-part of application No. 09/659,530, filed on Sep. 12, 2000, now Pat. No. 6,649,202.

(51) Int. Cl.⁷ ................................................ A23D 9/05
(52) U.S. Cl. ........................ 426/291; 426/304; 426/307; 426/607; 426/417; 426/515; 426/524; 62/71; 62/74
(58) Field of Search ................................ 426/284, 291, 426/302–304, 307, 601, 607, 609, 417, 515, 524; 62/66, 71, 74, 353, 354, 347; 264/5, 7

(56) References Cited

U.S. PATENT DOCUMENTS

| | | | |
|---|---|---|---|
| 788,446 A | 4/1905 | Wilson | |
| 2,491,837 A | * 12/1949 | Smith-Johannsen et al. | .. 62/172 |
| 3,020,732 A | 2/1962 | Carpenter | ..................... 62/345 |
| 3,095,305 A | 6/1963 | Kearns, Jr. | ..................... 99/118 |
| 3,514,297 A | 5/1970 | Campbell, Jr. et al. | ........ 99/118 |
| 3,549,387 A | 12/1970 | Howard | ........................ 99/122 |
| 3,637,402 A | 1/1972 | Reid et al. | ................. 99/118 R |
| 4,043,140 A | 8/1977 | Wendt et al. | ................... 62/66 |
| 4,272,558 A | 6/1981 | Bouette | ........................ 426/660 |
| 4,762,725 A | * 8/1988 | Player et al. | ................ 426/582 |
| 4,891,233 A | 1/1990 | Belanger et al. | ............... 426/94 |
| 5,431,945 A | * 7/1995 | Miller et al. | .................. 426/580 |
| 5,866,187 A | 2/1999 | Kines et al. | .................. 426/549 |
| 6,054,167 A | 4/2000 | Kines et al. | .................. 426/549 |
| 6,063,423 A | * 5/2000 | Virtanen | ....................... 426/302 |
| RE36,785 E | 7/2000 | Colson et al. | .............. 426/551 |
| 6,312,752 B1 | * 11/2001 | Landsbergen et al. | ....... 426/607 |
| 6,370,886 B1 | * 4/2002 | Ochs | ............................... 62/63 |
| 6,488,973 B1 | * 12/2002 | Wright | ........................ 426/114 |

FOREIGN PATENT DOCUMENTS

| | | |
|---|---|---|
| EP | 165720 A1 * | 12/1985 |
| GB | 2 176 143 A | 12/1986 |
| JP | 361106314 A | 5/1986 |

OTHER PUBLICATIONS

Bailey's Industrial Oil and Fat Products, vol. 3, by Thomas H. Applewhite (Wiley–Interscience), date n.a.

Research Dept. Technical Bulletin, vol. XIX, Issue 11, Nov. 1997, Chemically–Leavened Pizza Crusts by Thomas A. Lehmann, pp 1–6.

* cited by examiner

Primary Examiner—Drew Becker
(74) Attorney, Agent, or Firm—Shughart Thomson & Kilroy P.C.

(57) ABSTRACT

An apparatus and method of preparing solid flakes of fats and emulsifiers having a Solid Content index or a Solids Fat Index which is below the Agglomeration Boundary is provided utilizing a generally flat, cold plate to solidify the fat or emulsifier and a method which allows the application of a coating to the flake to assist in avoiding loss of flake separation and to maintain pourability of the flaked product.

11 Claims, 9 Drawing Sheets

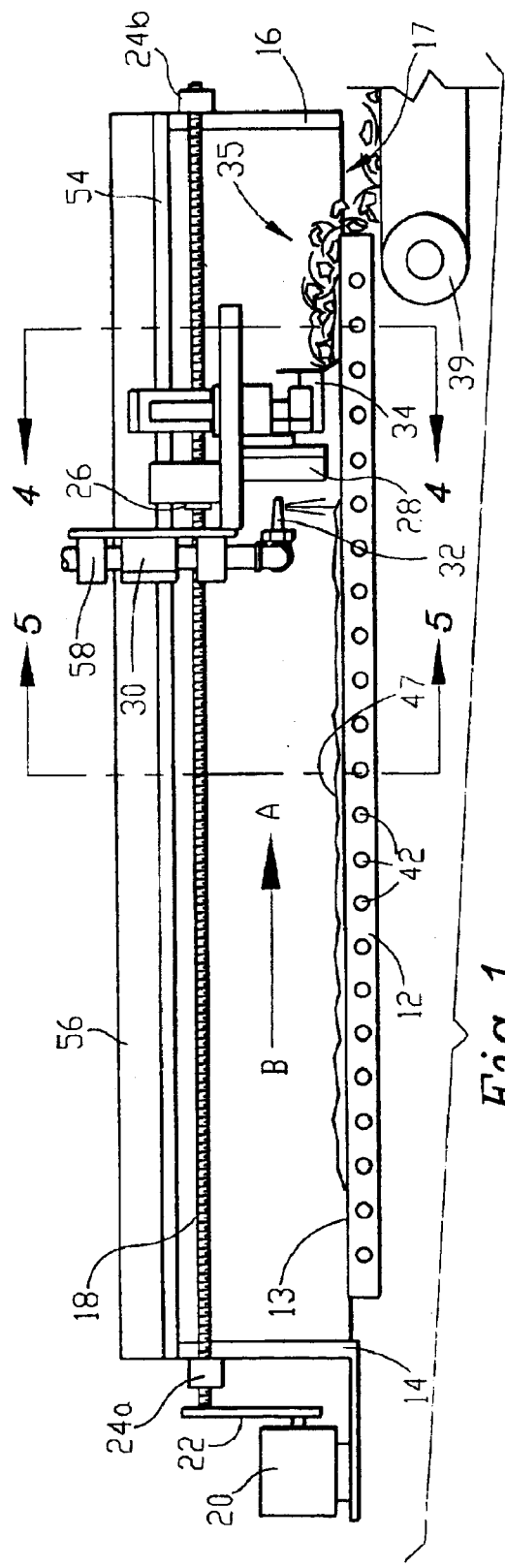
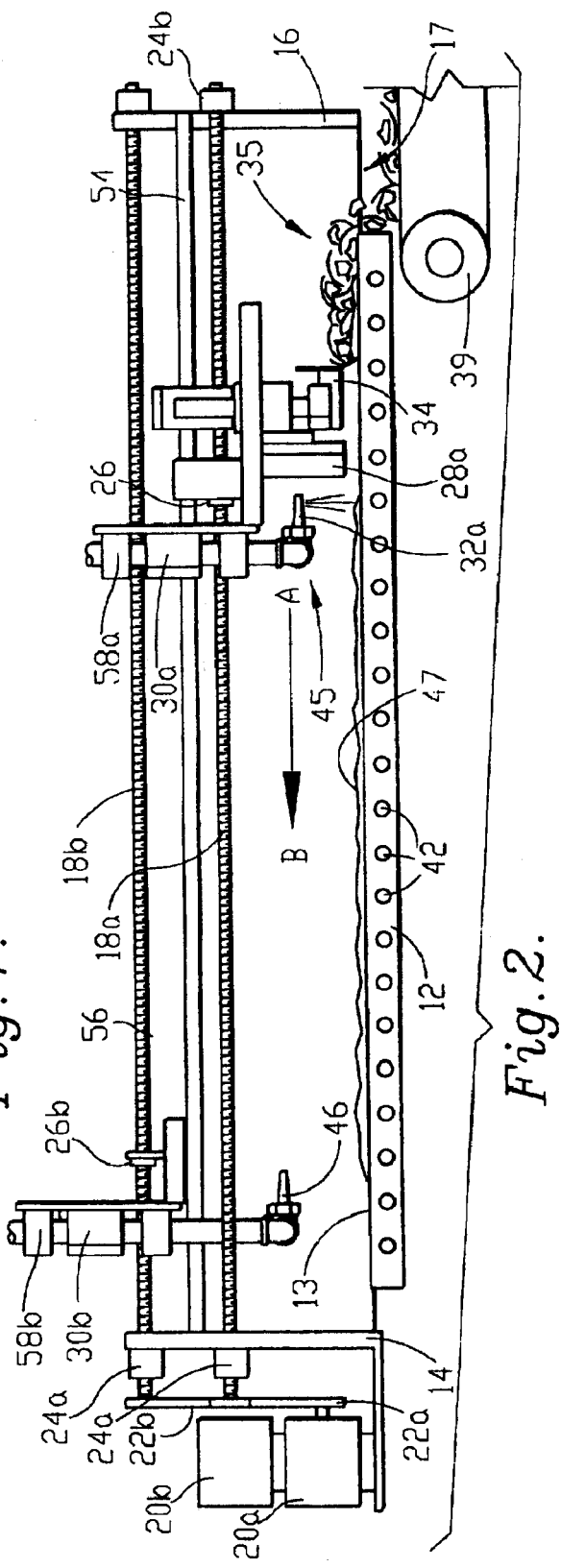

COATED FLAKED FATS

This is a continuation-in-part of application Ser. No. 09/659,530 filed Sep. 12, 2000, now U.S. Pat. No. 6,649,202.

FIELD OF THE INVENTION

The present invention relates to the manufacture of flakes or chips of congealed fats, or more technically triglycerides, including edible fats, lard and various commercial food products such as edible oils and emulsifiers. In particular the present invention relates to the preparation of flaked shortenings from mixtures comprising oil and oil and fat products having a Solids Fat Index which is below the Agglomeration Boundary.

In addition, the present invention relates to the field of layering or encapsulating solid or flaked material within other materials. This layering or encapsulation of solids can take the form of: (1) solids mixed in a liquid oil which is hardened and flaked; (2) solids directly added to a liquid which is in the process of being hardened and flaked; and (3) encapsulation of solids with liquids and liquid/gas mixtures of both edible and to inedible material.

The present invention is particularly suited to flaking emulsifiers. Emulsifiers or emulsifying agents include mono- and diglycerides of fatty acids, propylene glycol, mono- and di-esters of fatty acids, glycerol-lactose esters of fatty acids, ethoxylated or succinylated mono- and diglycerides, lecithin, diacetyl tartaric acid esters or mono- and diglycerides, sucrose esters of glycerol, phospholipids or equivalents there of and mixtures thereof.

A variety of edible oils are contemplated for use with the present invention, in particular, oil from oil seeds including cotton seed oil, soy bean oil, corn oil, peanut oil, sunflower oil, castor seed oil, safflower oil, palm and olive oils, and the like. The term "fat" is used generally to refer to edible fats and oils comprising triglycerides, fatty acids, fatty alcohols, and ester of such acids and alcohols. For the purposes of this invention, appropriate components are triglycerides of straight chain or branch chain, saturated or unsaturated monocarboxylic acids having from 10 to 28 carbon atoms. suitable sources of such fats are: (1) vegetable fats and oils, as indicated above; (2) meat fats, such as tallow or lard; (3) marine oils, such as menhaden, pilchard, sardine, whale or herring; (4) nut fats and oils such as coconut palm or peanut; (5) milk fats, such as butter fat; (6) coca butter and coca butter substitutes, such as shea or illipe butter; and (7) synthetic fats or a re-esterified fats with fractionated fatty acids.

The present invention further contemplates the addition of various additives into the mixtures to be flaked. It will be appreciated that the use of additives in liquid compositions will lower the melting point of the liquid composition. These additives can be flavorings such as butter, buttermilk, cinnamon, or color such as beta carotene or annoretta or saffron. Solids or solid powders may be included such as non-fat dry milk solids or the pulp of various fruits such as raspberry and blueberry and along with other natural or imitation flavorings or colorings. The present invention overcomes the depression of the melting point which occurs when additives are included in a liquid.

BACKGROUND OF THE INVENTION

It has long been known that fatty substances could be cooled to a solid or semi-solid by applying a hot or warm liquid or semi-liquid of the fat to a rotating drum or continuous cooling belt. In U.S. Pat. No. 788,446 to A. R. Wilson, a liquid fat is sprayed onto a rotating drum or cylinder which is cooled with ice or ice and salt. As the drum rotates, the previously applied liquid is scraped from the drum, and the scraped area of the drum is then subsequently presented for another application of the fat or liquid to be congealed.

These types of drum cooling or mechanical cooling are relatively successful for substances having a sufficiently high melting point. However, as the melting point decreases, the resident's time of the substance on the drum must be increased in order to chill the liquid to a sufficient hardness that upon scraping the substance from the drum, the material cleanly breaks free of the drum and is sufficiently solid that it does not melt together with other materials scraped from the drum. In addition, as the melting point of the liquid applied to the drum becomes lower and lower, the opportunity for the material to melt together again, or to agglomerate, increases due to the continued release of heat from within the formerly liquid substance as it becomes more and more solid after being scraped from the roller and packaged.

In particular, as a substance is chilled to change the material from a liquid to a solid, the heat within the liquid substance is removed, and the material is reduced in temperature to a point at which crystallization of the material begins and a solid of the material begins to form within the liquid. The solid formation increases as heat is removed from the liquid substance. After a time, sufficient heat will have been removed from the substance that the once liquid material becomes generally solid. However, while a material has become generally solid, it may not be fully crystalized and stabilized at a useful temperature. Rather, the material will continue to undergo greater solidification as an increasing percentage of the material becomes a solid crystal. During this period of continued crystallization, heat continues to be given off by the material as it turns from a semi-solid into a solid or becomes stabilized at a particular temperature below the melting point of the original liquid substance. This represents the release of the "heat of crystallization" or the release of the "latent heat of crystallization" of the substance.

In the process of forming chips or flakes from triglycerides, emulsifiers or other edible and non-edible materials, the general process is to apply the liquid substance to a rotating, chilled drum, and to allow the material to stay in contact with the drum for sufficient time to permit the liquid to become sufficiently solid that it can be scraped from the drum. During the scraping process it is preferred that the solid or semi-solid break into flakes or fragments rather than peeling from the drum as a continuous sheet. Once the flakes or fragments of the substance are removed from the drum, they are usually packed into a container and placed into a cooling room for additional cooling and to retain the material in a solid state. It is during this period in the cooling room that additional solidification of this substance continues. As a result of this further solidification, internal heat is given off by the material which is referred to as the "latent heat of crystallization." Once crystal growth, or solidification, has been initiated in a substance it is necessary, for additional solidification to occur, that heat be removed or transferred from the body undergoing crystallization or solidification. In the case of a partially solidified liquid which has been placed into a packing box, the latent heat of crystallization becomes trapped within the mass of material in the box and begins to generally raise the temperature of the substance. This can result in the material within the package agglomerating due to the latent heat of crystallization partially melting the solid which was formed on the rotating cold drum.

A graphical representation of this phenomenon can be seen in FIG. 6. In FIG. 6, the intermittent line indicates material having a melting point of approximately 114° F. which was initially cooled for 10–30 seconds on a roller. The graph shows that during the mechanical cooling period (T1) the temperature decreases from generally 5° F. above the melting point temperature of the fat to be flaked to approximately 50° F.–60° F. At time T2, packaging occurs as the material is scraped off the roller. At time T2, the time interval changes to days. Once the material is removed from the roller the temperature of the material begins to rise. This rise in temperature continues during the first portion of time T2 and after the packaged material is placed into a 40° F. cooling room. It is shown in FIG. 6 that the temperature of the material once packaged and residing in a cooling room continues to rise. This temperature increase is due to the latent heat of crystallization which causes the temperature of the packaged material to increase to approximately 100° F. The temperature of the material then decreases to the temperature of the cooling room over a period of an additional two to three days. This increase in temperature in the packaged material resulting from the latent heat of crystallization can cause agglomeration of the packaged material.

This rise in latent heat is a particular problem in materials having a Solids Fat Index which is below the line graphed in FIG. 10. FIG. 10 shows the solids content of a mixture of fats at various temperatures. The solids fat index is a manufacturing standard used to measure the extent of hydrogenation in the fat components used in a mixture. Over a limited range, the solid fat index (SFI) value is numerically, approximately equal to the actual percent solids in the mixture. At high temperatures the fat product will be completely melted. At low temperatures, the fat can be completely solid. In between these low and high temperature ranges, there are varying degrees of solid fat content in the fat composition. By selection of varying degrees of hydrogenated triglycerides, a variety of SCI profiles for various fat compositions can be developed. With respect to fat mixture suitable for flaking, the line in FIG. 10 represents an agglomeration boundary. For mixtures of hydrogenated triglycerides having solids compositions which fall below the agglomeration boundary, conventional drum and belt methods of flaking do not provide sufficient chilling time or sufficient temperature reduction in the mixture to: (1) produce sufficient nucleation in the fat mixture to allow flaking; (2) prevent the solidified fat from forming a sheet of material rather than flaking; and (3) reduce the temperature of the solidified material sufficiently to avoid re-melting of the material due to the latent heat of crystallization once the material is removed from the belt or roller and packaged.

In Belanger, et al. (U.S. Pat. No. 4,891,233), a solids fat index, which Benlanger calls a Solids Content Index, is provided to prepare flakes of fat which are particular suited to making of pie crust dough and ensure a consistent quality of pie crust. FIG. 11, (FIG. 3 of Belanger and reprinted hereas FIG. 11) shows the preferred SFI value profile. The preferred composition is shown in dotted line 52 and identified by the term flake. A deviation from the dotted line 52 may be accommodated in providing a range of SFI value for suitable fat composition. A lower boundary is determined by line 54 which is defined as the agglomeration boundary. The agglomeration boundary 54 is determined by a SFI profile that:

1. Avoids the flakes of fat agglomerating together during storage and losing their identity.

2. Provides flakes which are sufficiently malleable such that incorporated into the baking ingredients at room temperature.
3. When flakes of fat are produced on rollers or cooling belts, flakes below the agglomeration have a tendency to congeal and in some instances lose their identity and form lumps of fat which cannot be broken up and cannot be used in making of pastry dough.
4. The flakes must be capable of being stored at temperatures in the range of 80° F. to 100° F. without congealing together and cannot be broken up into free flowing chips.

The agglomeration boundary 54 is determined by an SCI value range which first avoids the flakes of fat agglomerating together during storage and loosing their identify and second, provides flakes which are sufficiently malleable such that when incorporated into the baking ingredients at room temperature, they may be easily worked into the dough making composition. At the other end of the scale, the appearance boundary 56 is defined by the necessity that the flakes of fat do not have too high of an SCI value at the upper temperatures, so that, when baked, the flakes of fat melt completely at the right time in the baking process to produce the desired pockets and flakiness, and thus avoid a "cratering" effect. The cratering effect is due to the fat not melting soon enough and due to gravity. The unmelted lumps of fat fall through the pastry dough forming holes in the pastry. In defining the agglomeration boundary at the lower temperature end and the appearance boundary at the higher temperature end, it is an understood characteristic of fat compositions that any fat which has an SCI value in the range of 50 to 70 is above the agglomeration boundary, but cannot go too high or else the SCI values are above the appearance boundary 56. Similarly, a fat composition having a value below the appearance boundary range, would be below the agglomeration boundary 54. Hence, the agglomeration boundary 54 and the appearance boundary 56 define the acceptable range of SCI values for the into fat composition which is particularly suitable to use in the making of pastry dough. By experimentation, it has been determined that any flake composition having an SCI value below the agglomeration boundary results in flakes which have a tendency to congeal and in some instances loose their identity and form lumps of fat which cannot be broken up and hence cannot be used in the making of pastry dough. Similarly, it has been discovered that SCI values for flake compositions which are above the appearance boundary result in flakes of fat which produce the cratering effect. However, any flake composition having SCI values within these boundaries over the entire range of 50° degrees F. to 150° degrees F. produces a very acceptable, consistent, baked pastry quality.

Additional criterium which was considered in defining the agglomeration boundary, is the storage capability of the flakes. The flakes must be capable of being stored at temperatures in the range of 80 degrees to 100 degrees F. without agglomerating to an unacceptable extent. Unacceptable agglomeration occurs in situations where the flakes have congealed together and cannot be broken up into free flowing chips. From FIG. 11 it is apparent that a solids fat index at 50 degrees F. is a minimum of approximately 50% and the solids fat index at 105 degrees F. is a maximum of approximately 10%.

Therefore, a fat or fat mixture for the purposes of this invention is considered to produce a flake that is below the Agglomeration Boundary when the fat or fat mixture has a Solids Fat Index profile comprising approximately 50% @50° F. and approximately 35% @70° F. Fats or fat mixtures also should have a Solids Fat Index profile of above approximately 15% @50° F. and approximately 10% @70° F.

The present invention avoids all these problems of roller and belt flaking devices and permits the flaking of fat and or emulsifier mixtures which have a solids fat index profile which is below the approximate agglomeration boundary shown in FIG. 10.

Yet another drawback of the use of drum cooling for materials of the kind previously described is that when the melting point of the material becomes sufficiently low, generally 105° or below, the latent heat of crystallization will tend to be sufficient to virtually remelt the material or to cause the flakes or chips of the material to become a connected mass within the packaging material. Therefore, the use of rotating drum devices to cool materials having low melting points becomes ineffective, and triglycerides and other oils which have low melting points cannot be mixed with other substances which would have the effect of lowering the melting point of the triglyceride or the fatty substance to a point at which the drum cooling method would be ineffective as a result of the latent heat of crystallization causing the newly solidified material to form a mass once placed into packaging.

Another problem is commonly encountered with emulsifiers that do not contain a sufficient amount of nucleating hard fat to initiate crystallization. In this case the emulsifier does not form a flake or a chip when cooled, but forms a continuous sheet of material which peels-off the belt or drum cooling device It will be appreciated by those skilled in the art that increasing retention time on the cooled rotating drum is an insufficient solution to this problem. Depending on the material being applied to the drum, if it is cooled too completely while on the drum, it will crack away from the drum and fall off the drum prior to it reaching the scraper blade or reaching a point at which collection of the material is desired. In certain types of drum cooling systems, the liquid is applied by the bottom of the drum rotating through a vat or pool of warmed liquid. The liquid then adheres to the drum and is cooled during the rotation of the drum, and the material is scraped from the drum prior to a second emersion in the vat of liquid. In this situation, slowing the drum can result in substantial loss of heat into the vat of hot or warm oil or triglyceride and can result in the heating of the material in the vat and the cooling of the drum operating at cross purposes.

Yet another problem encountered with the use of flaked shortening products is that the product is often subjected to temperatures as high a 70° F. to 100° F. during the shipping of the flaked shortening product to customers. It is not uncommon for a pallet of cases of a flaked shortening product to sit on a loading dock for an afternoon in temperatures which cause the flaked shortening product in the package to reach 70° F. to 100° F. As a result of this increase in temperature flaked shortening products that are made with mixtures comprising fats that have an SFI curve near or below the Agglomeration Boundary (FIG. 10) will warm and soften and loose their individual flake integrity. When such a warmed flaked shortening product is subsequently removed from the loading dock and re-cooled for use in baking the once individual flakes will harden together during the re-cooling and stick to one another in a large mass. Such a mass of flakes must either be rejected by the consumer or be broken apart before being mixted into the baking dough.

Therefore, it would be beneficial to the food industry in general if an apparatus and method were available to solidify low-melting triglycerides and edible oils, emulsifiers and mixtures thereof and the like which avoided the drawbacks of the cold drum method of forming such solids. In addition, it would be a great benefit to the food industry if the method and apparatus allowed multiple substances to be layered upon one another to form a sandwiched solid of several different materials which could then be chipped or flaked and incorporated into foodstuffs.

A further benefit to the food and shipping industry could be obtained if solidified low-melting triglycerides and edible oils, emulsifiers and mixtures thereof and the like have a Solids Fat Index that is near or below the Agglomeration Boundary could be prepared which could be heated and re-cooled after formation of the flake with out loss of flake separation or flake structure and which would remain substantially in a pourable state for use in baking and food preparation.

The aforementioned debilities are overcome by the present invention, and the desirable advantages and solutions of the present invention will become apparent to those skilled in the art upon reading the following specification in conjunction with the drawings provided herein of a preferred embodiment of the invention.

SUMMARY OF THE INVENTION

The present invention utilizes a generally horizontal surface of a cold plate to allow longer contact times of a liquid with a cold plate in order to convert the liquid to its solid form and to effect a greater degree of solidification of the liquid than is possible using the chilled rotating drum method of solidification of liquids. The present invention further allows for increased removal of the latent heat of crystallization from the substance being solidified to reduce the rise in temperature within the material once it is packaged which results from the latent heat of crystallization in materials which are initially solidified using chilled rotating drum or moving belt apparatus and methodology.

In particular, the present invention utilizes a horizontal cooling plate to receive applications of a liquid material for conversion from the liquid form to the solid form, and to provide the material with sufficient cold plate contact time to greatly reduce the remaining latent heat of crystallization after solidification of the material. The material is then scraped from the work surface of the cooling plate. The present invention accomplishes this method of solidifying liquids by moving an applicator or dispenser or spray nozzle across the surface of the cooling plate to dispense onto the cooling plate the liquid material. The method then scrapes the cooling plate to remove the solidified material from the work surface of the cooling plate by moving the scraper across the surface of the cooling plate. In a preferred embodiment of the invention, the apparatus utilizes a motor-driven screw drive rod to move a carriage holding spray nozzles and scrapers across the surface of the cooling plate to perform the previously described functions. However, it will be appreciated that any manner of moving the dispenser and scraper across the cooling plate would be an equivalent device.

Further, the present invention provides a method for the addition of a coating to a flaked shortening having a Solids Fat Index profile which is near or below the Agglomeration Boundary which assists in preventing loss of flake separation or flake structure and which allows the flaked shortening to remain substantially in a pourable state for use in baking and food preparation when the flaked shortening is exposed to heating and re-cooled after formation of the flake and during shipping and storage.

A fat or fat mixture for the purposes of this invention is considered to produce a flake that is below the Agglomeration Boundary when the fat or fat mixture has a Solids Fat Index profile comprising approximately 50% @50° F. and approximately 35% @70° F. Fats or fat mixtures also should have a Solids Fat Index profile of above approximately 15% @50° F. and approximately 10% @70° F.

In this apparatus and method, the objects of the present invention can be achieved which consist of cooling a liquid to a solid form while removing substantially all of the latent heat of crystallization from the formed solid to allow flaking of mixtures having a high percentage of low melting components.

Another object of the present invention is to allow increased retention time of a liquid on a cooling surface to permit removal of nearly all of the latent heat of crystallization and to lower the temperature of the resulting solid to a temperature which will allow the solid to easily be flaked and to avoid formations of sheets of material.

Another object of the present invention is to provide for simultaneous application of multiple liquids or multiple solids or mixtures of solids, liquids and/or gasses such as nitrogen or air onto a cooling plate so that multiple layered solids and solid solutions can be produced.

Yet another object of the present invention is to allow sequential applications of liquids and solids to a cold plate to provide multi-layered solids which can then be removed from the plate in their solid form.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention.

DESCRIPTION OF THE DRAWINGS

Preferred embodiments of the invention, illustrative of the best modes in which the applicant has contemplated applying the principles, are set forth in the following description and are shown in the drawings and are particularly and distinctly pointed out and set forth in the appended claims.

FIG. 1 is a longitudinal cross-sectional view taken along line 1—1 of FIG. 7 of a preferred embodiment of the invention showing a scraper and a dispenser disposed for travel across the plate work surface;

FIG. 2 is a longitudinal cross-sectional view of another preferred embodiment of the invention showing a scraper and a first and a second dispenser disposed for travel across the plate work surface;

DESCRIPTION OF A PREFERRED EMBODIMENT

Figure 3:
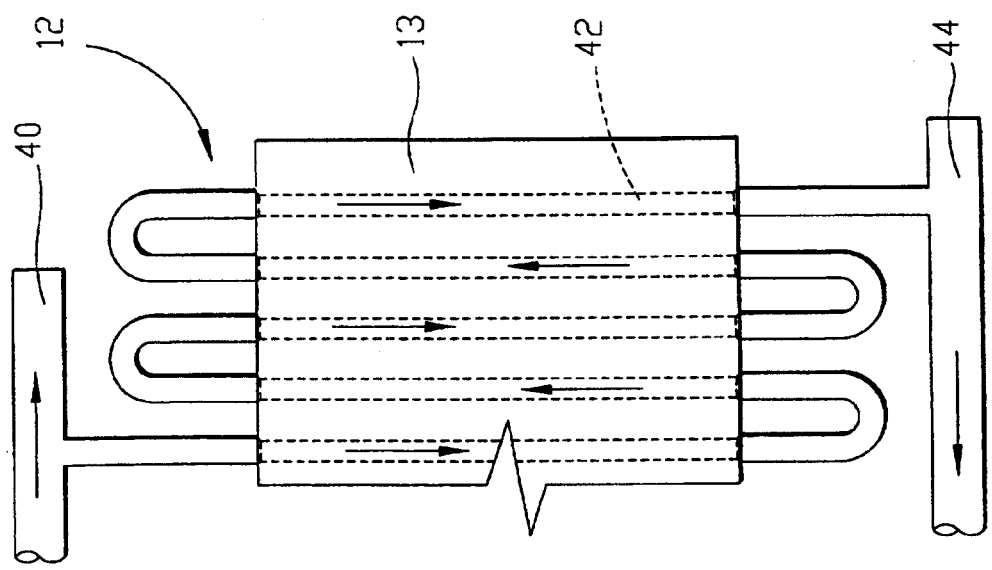
FIG. 3 is a fragmented plan view of the cooling plate of the embodiments of FIGS. 1 and 2 and showing the exterior coolant lines and showing, in phantom lines, the voids in the cooling plate to allow circulation of coolant within the plate.

Referring now to FIG. 1, a longitudinal cross-sectional view of plate flaker 10 is shown. Plate flaker 10 is comprised of cooling plate 12 which is supported by a frame or base (not shown). Cooling plate 12 is cooled to a selected temperature by circulating coolant through voids 42 of cooling plate 12. Mounted above work surface 13 of cooling plate 12 is carriage 28 which is mounted on screw drive 18 to permit back and forth or reciprocating movement of carriage 28 across work surface 13 of cooling plate 12. Screw drive 18 is mounted generally above cooling plate 12 by bearings 24a, 24b which are mounted on head plate 14 and end plate 16. Screw drive 18 extends through bearing 24a for connection to belt 22 which is attached to screw drive motor 20. Drive motor 20 is a reversible motor which allows screw drive 18 to be turned selectively in the clockwise or counter-clockwise direction in order to impart reversible movement to carriage 28 to allow carriage 28 to move back and forth across cooling plate 12.

Still referring to FIG. 1, in a preferred embodiment, carriage 28 has spray nozzle 32 and flow valve 30 attached to carriage 28 to accomplish the distribution or spraying of a liquid material 47 onto cooling plate 12. The spraying of material onto cooling plate 12 is accomplished during the movement, or reciprocation, of carriage 28 on screw drive 18 along the distance of work surface 13 of cooling plate 12. Also attached to carriage 28 is scraper 34. Scraper 34 is moveable between a raised position which is out of contact with work surface 13 and a lowered position which is in contact with work surface 13. Scraper 34 is raised and lowered by pneumatic cylinders 36 which are provided with cylinder guide rods 38 to stabilize movement of scraper 34.

In a preferred embodiment (FIG. 4), cylinders 36 are pneumatically activated by gas pressure from line 37' causing downward travel of scraper 34. The upward movement of scraper 34 is operated by gas pressure in line 37 (FIG. 4) to active cylinder 36. It will be appreciated by those skilled in the art that carriage 28 can carry more than one spray nozzle 32 and flow valve 30. For example, multiple spray nozzles 32, each equipped with a flow valve 30, allow the spraying of multiple components onto work surface 13 of cooling plate 12. By way of example and not limitation, it will be appreciated that a first spray nozzle 32 could deliver a first liquid onto work surface 13, while simultaneously, a second spray nozzle 32 is delivering a second liquid onto work surface 13, and while a third spray nozzle 32 or additional spray nozzles 32 are delivering additional liquids onto work surface 13. In this manner, a number of different liquids could be simultaneously delivered onto work surface 13 of cooling plate 12. Alternatively, the multiple spray nozzles 32 previously mentioned, could be operated in a sequential manner by alternating spray nozzles during multiple passes of carriage 28 on screw drive 18 across work surface 13.

By further way of example and not limitation, it may be useful to equip carriage 28 with multiple spray nozzles 32, each of which delivers a separate liquid or solid material onto work surface 13. For instance, during a first reciprocation or pass across work surface 13, a first spray nozzle 32 might deliver a base liquid onto work surface 13 to solidify the liquid into a solid. On a second pass, a second spray nozzle 32 might spray a powder aerosol onto the first layer, and on a third pass, a third spray nozzle 32 could deliver a second liquid layer or solid powder aerosol or solid via a solids applicator onto work surface 13 to build up a multiple layered product on work surface 13 of cooling plate 12. It will be appreciated by those skilled in the art that by the use of separate spray nozzles to deliver differing amounts of material onto work surface 13 that differential layer thicknesses could be provided onto work surface 13 to accumulate. Alternatively, it will be appreciated that the pump speed can be varied by slowing and increasing the pump speed to affect the flow of the material onto work surface 13 or to slow the travel of the carrier while maintaining constant material thickness on work surface 13. In addition, such variation in layer thickness could be achieved by increasing or slowing down the speed at which screw drive 18 rotates.

The addition of solid material onto work surface 13 can be accomplished through the use of a solids applicator which is well known in the industry. The solids applicator consists of a hopper having a flow tube descending therefrom and a rotating breaker bar mounted in the bottom of the hopper. As the hopper is moved across work surface 13 whether by attachment to a carriage 28 or another device for moving the hopper, the solid material which has been loaded into the hopper is distributed across work surface 13 to mix with other materials which have been loaded onto work surface 13.

Referring now to FIG. 2, an alternate method of providing for multiple applications of materials onto work surface 13 of cooling plate 12 will be discussed. In FIG. 2, an embodiment of the invention is shown in which a second applicator 46 is provided. Second applicator 46 allows for a second layer of material to be dispersed onto work surface 13 in a sequential manner by using applicators on multiple carriers.

In operation, the embodiment of FIG. 2 can apply a second layer from applicator 46 while following close behind first applicator 45. In FIG. 2, second applicator 46 has already completed laying down second applicator layer 47 onto work surface 13 and first applicator 45 is applying a second layer. In placing layer 47 on work surface 13, second applicator 46 has traveled from near first applicator 45 toward head plate 14, or in the direction of Arrow B. In placing a second layer onto work surface 13, and on top of second applicator layer 47, first applicator 45 travels toward second applicator 46 while spraying a liquid or a powder from nozzle 32a or from a solids applicator onto layer 47. Once first applicator 45 has completed its application of material onto work surface 13 on top of second applicator layer 47, scraper 34 of first applicator 45 can be lowered onto work surface 13. First applicator 45 is then moved in the direction of Arrow A to scrape the now solid material off of work surface 13 and toward end plate 16 where the solid material 47 will fall through opening 17 and onto conveyor 39.

Referring now to FIG. 3, the assembly used to cool plate 12 and work surface 13 is shown. FIG. 3 is a fragmenting plan view of cooling plate 12. Cooling plate 12 is provided with voids 42 which are bored completely through cooling plate 12. Voids 42 allow a coolant to be introduced into cooling plate 12 by coolant inlet pipe 40. The coolant is selected to establish cooling plate 12 at a temperature sufficient to change the material layered onto work surface 13 from a liquid into a solid that flakes. The coolant circulates through a section of cooling plate 12 and exits from cooling plate 12 by coolant return pipe 44. The coolant is then circulated through a compressor or refrigeration system to again reduce the temperature of the exiting coolant to the appropriate temperature for reuse to cool cooling plate 12.

Figure 4:
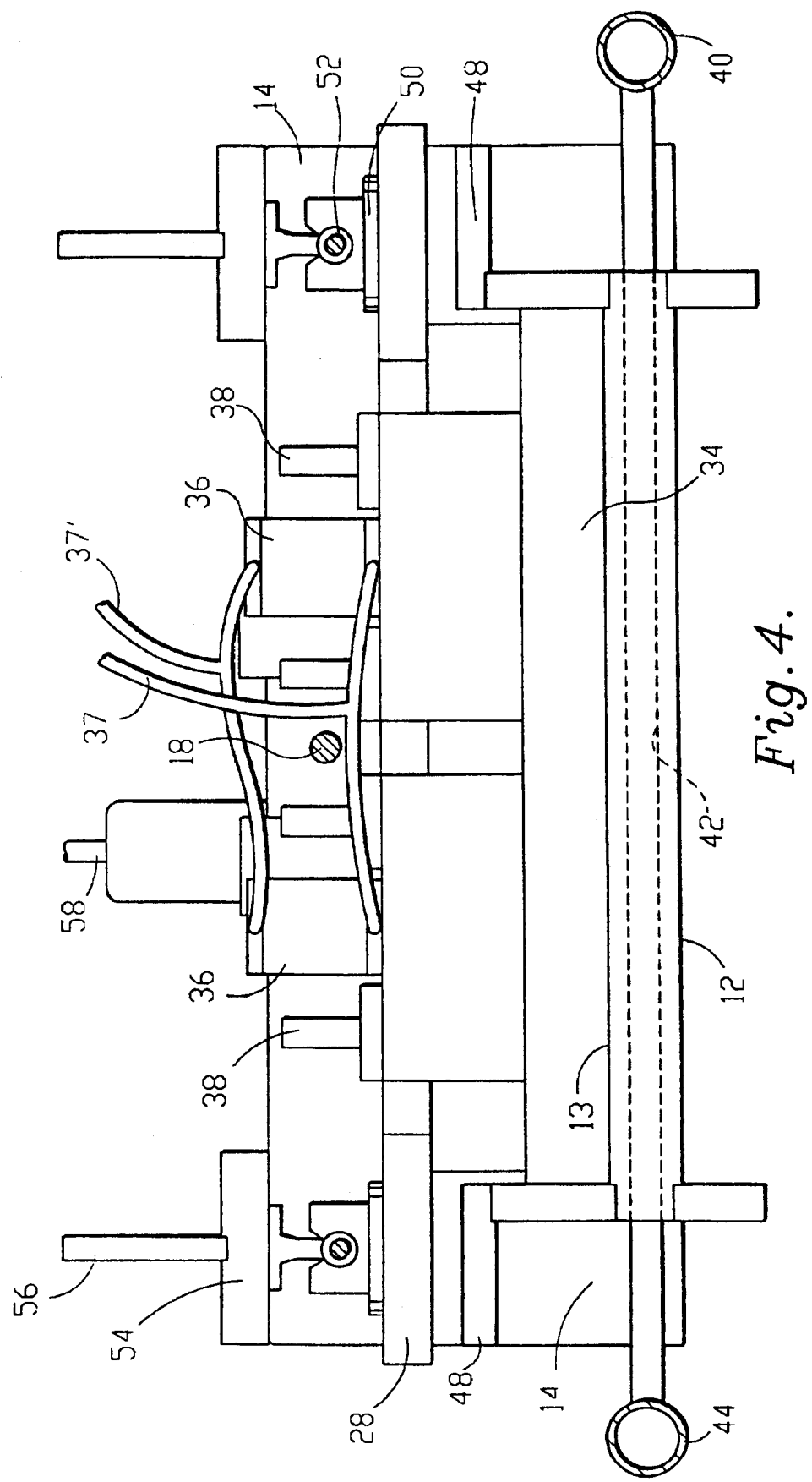
FIG. 4 is a transverse cross-sectional view taken along line 4—4 of FIG. 1 and showing the mounting of the scraper on a carrier for movement across the plate work surface and showing the scraper in contact with the cooling plate surface.

Referring now to FIG. 4, the transverse cross-sectional view of the embodiment shown in FIG. 1 presents scrapper bar 34 in its downward position so that it is in contact with work surface 13 of cold plate 12. Scrapper 34 is raised and lowered by pneumatic cylinders 36 and is stabilized during its movement by cylinder guide rods 38. In operation, once a material has been placed onto work surface 13 and has solidified, scrapper 34 is lowered onto work surface 13 and the carriage advanced in order to scrape the material off of work surface 13 and to push the material toward void or opening 17 (FIG. 1) and onto conveyor 39.

Figure 5:
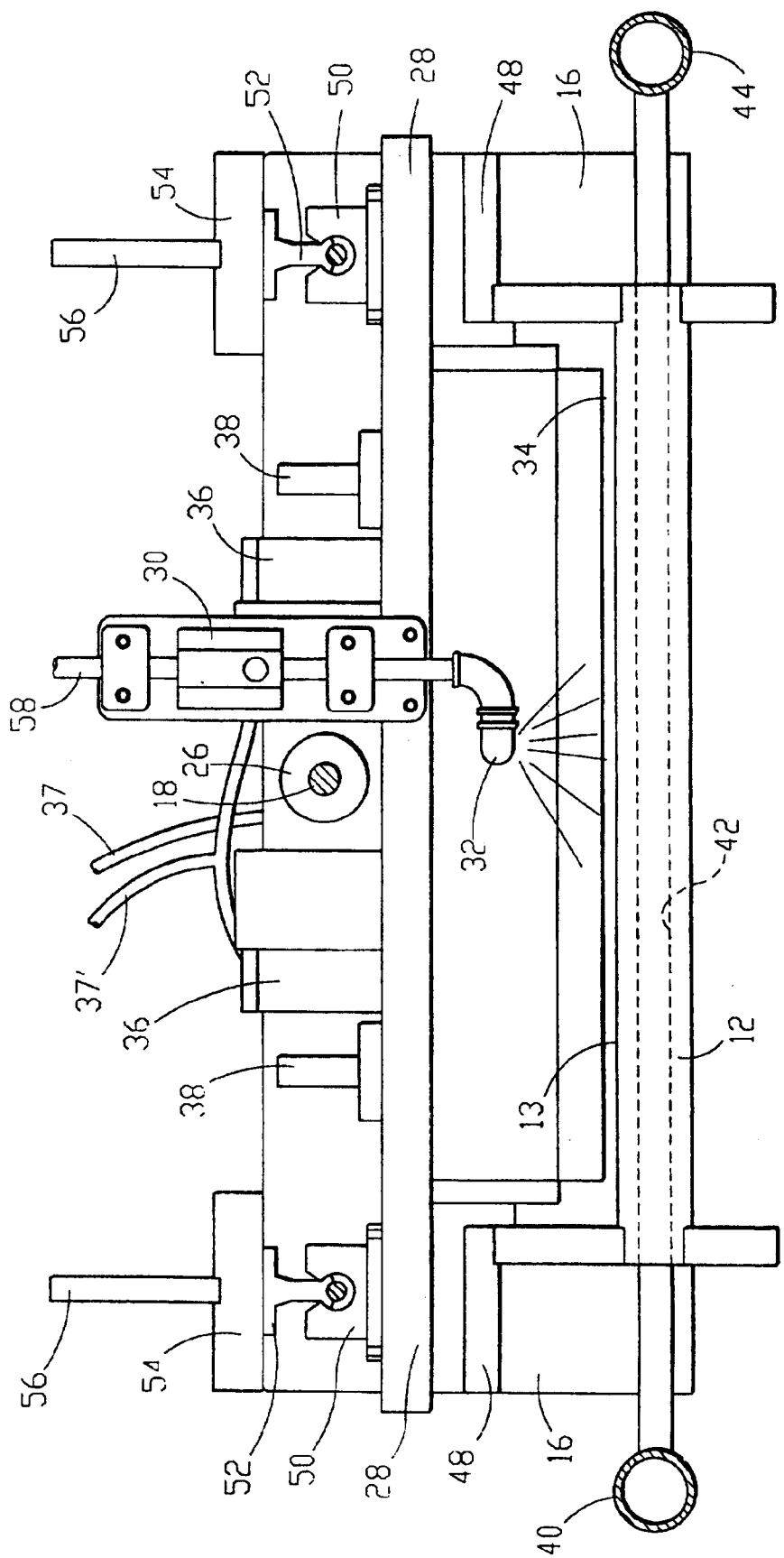
FIG. 5 is a transverse cross-sectional view taken along line 5—5 of FIG. 1 and showing the mounting of the dispenser on a carrier for movement of the dispenser across the plate work surface to dispense a substance onto the work surface.

Referring now to FIG. 5, the mounting of carriage 28 will be discussed in greater detail. FIG. 5 is a transverse cross-sectional view of the embodiment of FIG. 1 and shows work surface 13 of cooling plate 12 to be below spray nozzle or dispenser 32. Dispenser 32 receives a liquid fluid supply by connection with feed tube 58 which is connected to a supply (not shown) of material to be layered onto work surface 13. Feed tube 58 travels toward dispenser 32 from a supply and terminates at flow valve 30. Flow valve 30 is, in a preferred embodiment, pneumatically operated and provides positive flow and flow shut off to dispenser or spray nozzle 32. Adjacent flow valve 30 is carriage drive block 26 containing a threaded nut mounted to a flange which is adapted to receive the threads of acme screw drive rod 18 which passes through carriage drive block 29. Carriage drive block 29 allows carriage 28 to travel along screw drive rod 18 as drive rod 18 is rotated in either a clockwise or counterclockwise direction by motor 20 and belt 22 (FIG. 1). Carriage 18 is directed in its movement along the distance of cooling plate 12 by traveler bearings 50 which are attached to carriage 28. Traveler bearings 50 are connected to traveler rod 52 which is secured to support plate 54. This particular arrangement imparts stability and strength to the preferred embodiment and allows carriage 28 to operate continuously for long periods of time and reduces the number of moving parts which could result in failure during long hours of operation. Above support plate 54 is stand off plate 56 which can be used to mount a second carriage 28b (FIG. 2) to allow use of additional dispensers or spray nozzles 32.

Figure 6:
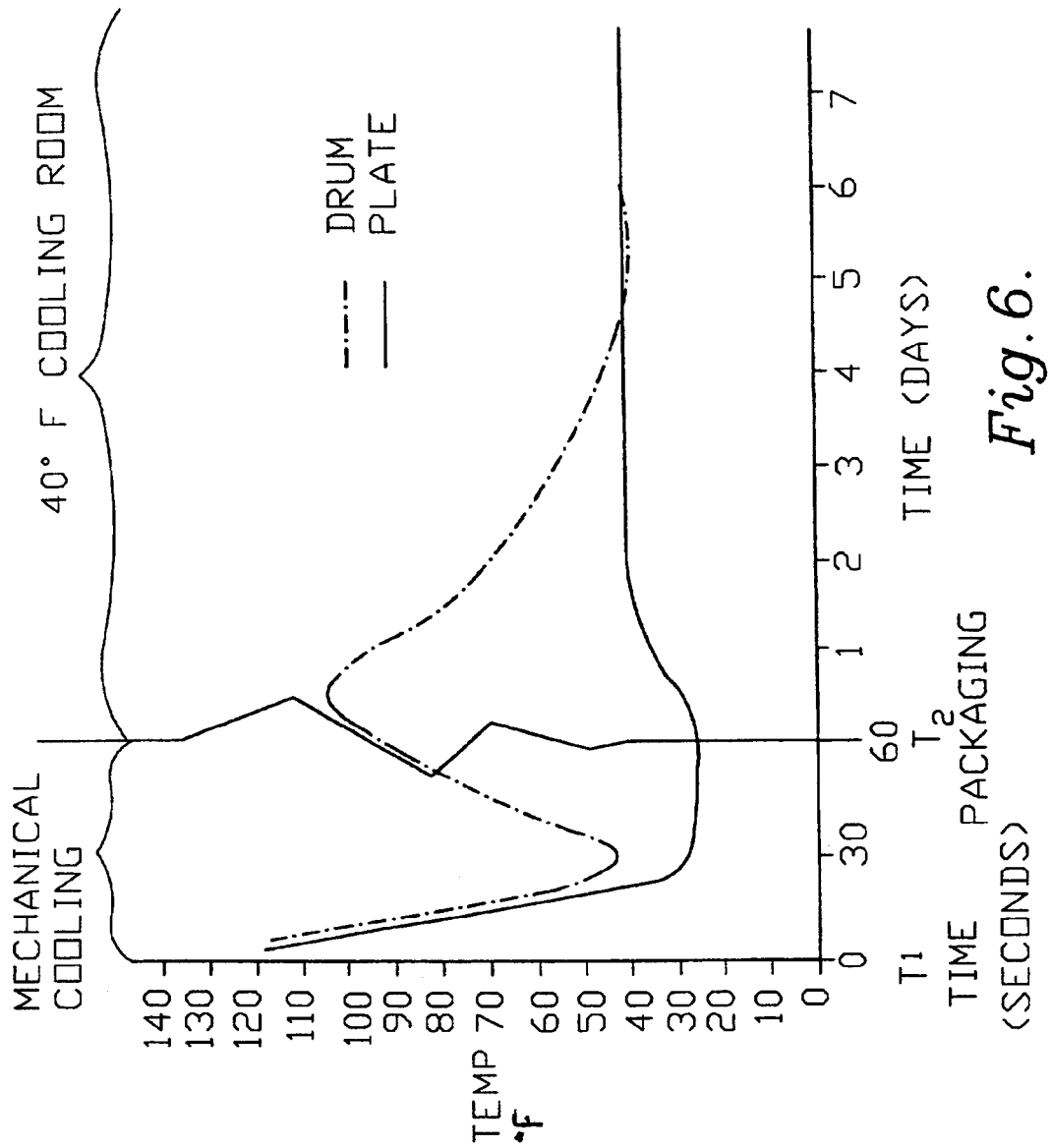
FIG. 6 is graph of temperature with respect to time for a liquid undergoing initial mechanical cooling on the present invention and on a rotating drum followed by a residence period in a cooling room and showing the rise in temperature of the packaged solid formed on a rotating drum during the residence period.

Referring now to FIG. 6, a graphical analysis of the beneficial results obtained from the present invention is shown. In FIG. 6, the temperature with respect to time is shown for a single substance which has been mechanically cooled by both a conventional rotating drum or roller method and the cooled flat plate of the present invention. Using the roller or rotating drum, it can be seen by examination of broken line that the liquid is placed on the drum at time T1 at a temperature of approximately 120° F. During the approximately 10–20 seconds exposure time to the chilled roller or drum, the temperature of the substance is reduced to approximately 60–65° F. which is the temperature at which the material sufficiently hardens to enable the material to be scraped off the drum and fragmented into flakes or chips at time T2. At time T2, packaging of the material occurs just after removal of the material from the belt, drum or roller.

In the case of the rotating drum method, the material is placed into a package and the package placed into a cooling room of approximately 40° within about two minutes of packaging. At time T2, the time period on FIG. 5 changes from seconds to days. The material which has been flaked on the rotating drum method then begins a rise in temperature shortly after removal from the drum. This deviation of temperature which continues over approximately the first three days the material is stored in the cooling room. This development of heat within the packaging is a result of the latent heat of crystallization which is given off as the material continues to harden within the package within the cooling room. At approximately the third day in the cooling room, the temperature of the packaging material begins to approach the temperature of the cooling room.

The temperature rise observed during the first one to three days in the cooling room due to the latent heat of crystallization is a substantial problem which results from the incomplete initial solidifying or crystallization of the material using the rotating drum method. Since the material is only partially solidified or crystallized on the rotating drum during the mechanical cooling period, additional solidification of the material continues during the cooling room, and the latent heat of crystallization is given off. This latent heat of crystallization as previously described tends to result in a rise in temperature of the packaged material. This rise in temperature can oftentimes be sufficient to bring the material again close to its melting point which results in fusion of the material within the package. This fusion problem is compounded by the palletizing of the packages for shipment. The grouping of the packages reduces the removal of heat from the packages and the internal packages on the pallet reach even a higher temperature than the outer packages.

This is a highly undesirable state and reduces the value of the material produced and also causes manufacturers of the material to institute a long holding period within a cooling room prior to shipment of the material. This long holding period increases inventory and stocks of packaged material which must be maintained in a cooling room for days, if not weeks, prior to shipment of the material. The present invention allows the reduction or elimination of the latent heat of crystallization temperature increase in packaged material and substantially shortens the amount of inventory which a producer needs to keep on hand prior to shipment and also reduces the amount of holding time of material prior to shipment. Both of these factors result in a substantial savings in production costs to the manufacturer.

Referring now to the solid line shown in FIG. 6, the results of the inventive method on the same liquid as was applied to the rotating drum will be discussed. The liquid is applied to the inventive flaking plate of the present invention at approximately 120°. During approximately the first ten to thirty (10–30) seconds of time in contact with the plate, the liquid drops in temperature from approximately 120° to approximately 25° and is converted to its solid state. The material is then scraped off of work surface 13 (FIG. 1) prior to time T2 after which it is immediately packaged. Subsequent to time T2, the material formed on the cold plate of the present invention undergoes only a slight rise in temperature due to latent heat of crystallization and production room temperature. In fact, in the example shown in FIG. 6, the temperature of the material rises to the temperature of the cooling room and stabilizes at the cooling room temperature of approximately 40° Fahrenheit. As is shown in the graph of FIG. 6, the material produced using the inventive method and apparatus exhibits little or no increase in temperature within the package due to the latent heat of crystallization.

Figure 7:
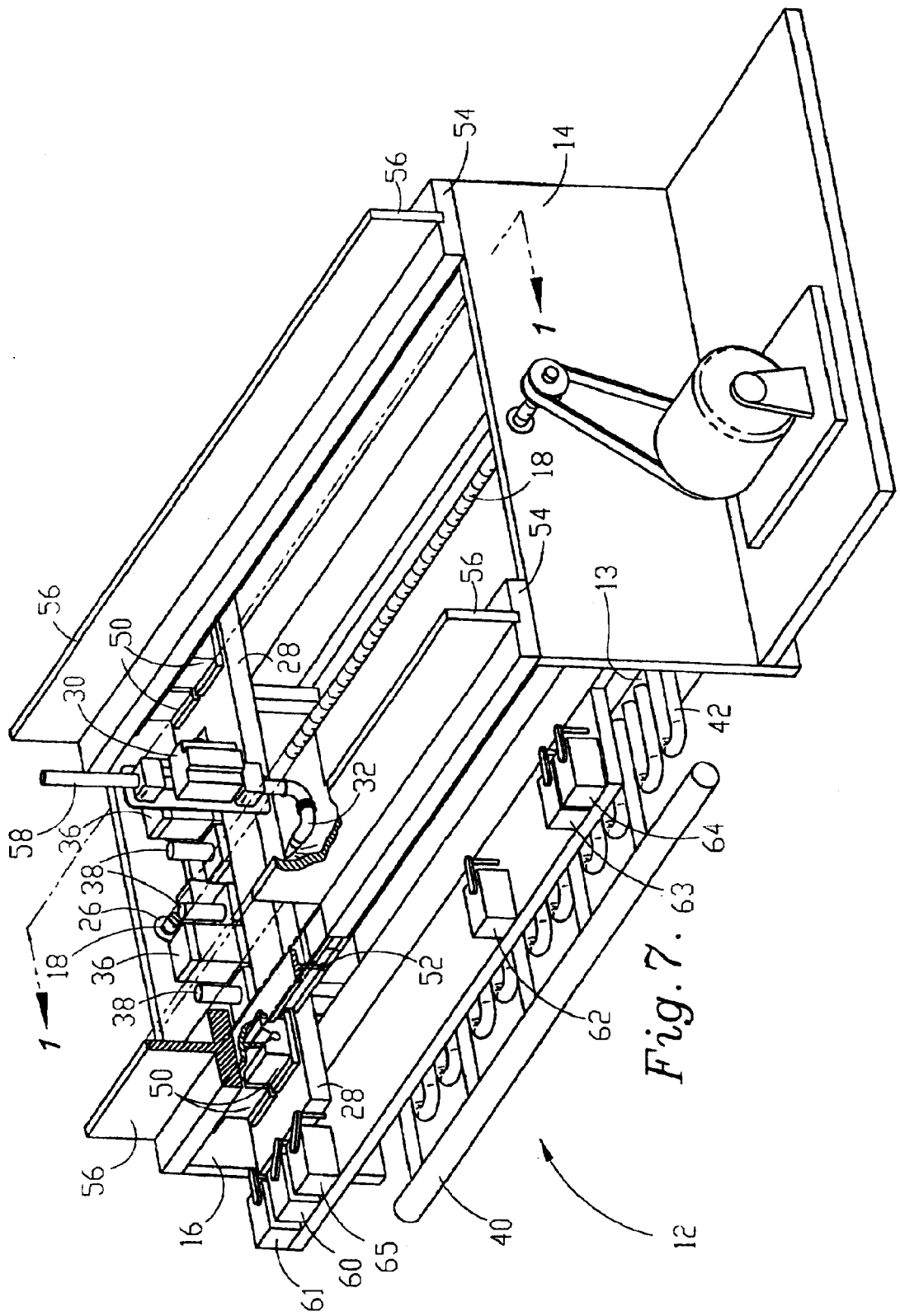
FIG. 7 is a top and left-side perspective view of the embodiment of FIG. 1 showing a dispenser on a carrier for movement of the dispenser across the plate work surface and showing the switches to activate and terminate various actions of the device.

FIG. 7 is a perspective view of the embodiment of FIG. 1. Shown in FIG. 7 are several switches which are switched off and on during the travel of carriage 28 along the work surface of the invention. An operation cycle of the invention will now be described beginning when carriage 28 is positioned at limit switch 63. At this position switch 63 has been pushed in the direction of plate 14 by the movement of carriage 28 toward plate 14. This movement of switch 63 stops the movement of carriage 28 toward plate 14 and reverses the direction of operation of motor 20 and lowers scraper 34 (FIG. 1) to contact work surface 13 and starts a timer for a timing interval. At the conclusion of the timing interval the timer activates motor 20 to send carriage 28 toward plate 16. During this movement toward plate 16, carriage 28 activates limit switch 62 to cause the opening of valve 30 to turn-on the flow of liquid from dispenser 32. Carriage 28 continues toward plate 16 and activates limit switch 65 to close valve 30 and turn-off the flow of the liquid from dispenser 32. Carriage 28 continues until it contacts limit switch 60 which stops the carriage, raises scraper 34 and activates a timer. At the end of the timing interval motor 20 is activated in the reverse direction. In the reverse direction, limit switch 62 is reset to its initial position so it can again activate the flow of liquid on the return trip of carriage 28 toward plate 16. Adjacent plate 14 and plate 16 are limit switches 61 and 64 which, if tripped, cut the power to the invention to emergency stop the travel of carriage 28.

In this manner, one cycle of operation of the invention is accomplished. That is a liquid material has been laid onto work surface 13 and solidified while on work surface 13 which is then followed by a pass along work surface 13 and cold plate 12 by carriage 28 with the scrapper in the downward position to remove the material from work surface 13 whereupon the material is pushed through void 17 (FIG. 1) and onto conveyor 39 (FIG. 1). It will be appreciated that the previous description of the operation in FIG. 7 has only described the very basic mode of operation of the present invention. It will be appreciated from the foregoing discussion that multiple passes of carriage 28 could be made on work surface 13 in order to distribute multiple layers of materials or multiple liquid and solid phases of material onto work surface 13.

Figure 8:
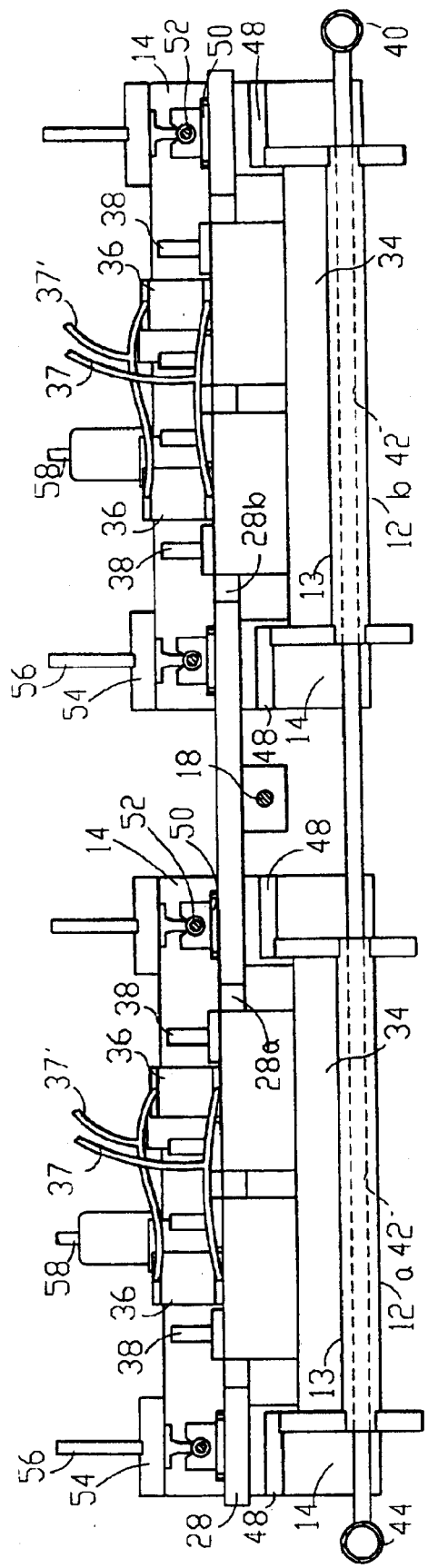
FIG. 8 is a transverse cross-sectional view of an embodiment of the present invention in which two cold plates, dispensers and scrapers are mounted side-by-side and operated by a single screw drive.

Referring now to FIG. 8, yet another embodiment of the present invention is shown wherein two iterations of the invention are placed side by side whereupon they are operated by a single screw drive 18 which is attached to carriage 28a and to carriage 28b. In the embodiment of FIG. 8, a single cooling system is utilized which introduces coolant at pipe 40 which then travels through cold plate 12a and onto cold plate 12b of the second iteration of the invention to exit from pipe 44. It will be appreciated that many such iterations of the invention could be connected in a series to operate simultaneously in order to increase the quantity of material generated during any portion of time.

Figure 9:
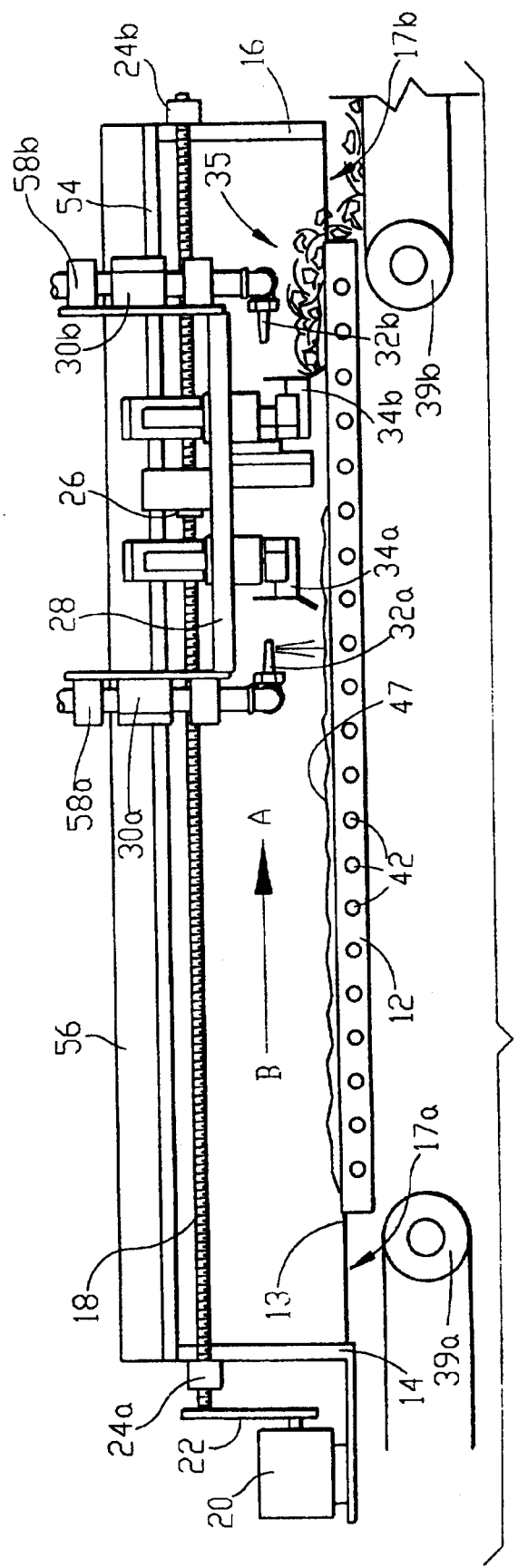
FIG. 9 is a longitudinal cross-sectional view of another preferred embodiment of the invention showing a double scraper and a double dispenser disposed on a single carrier for travel across the plate work surface.
Figure 10:
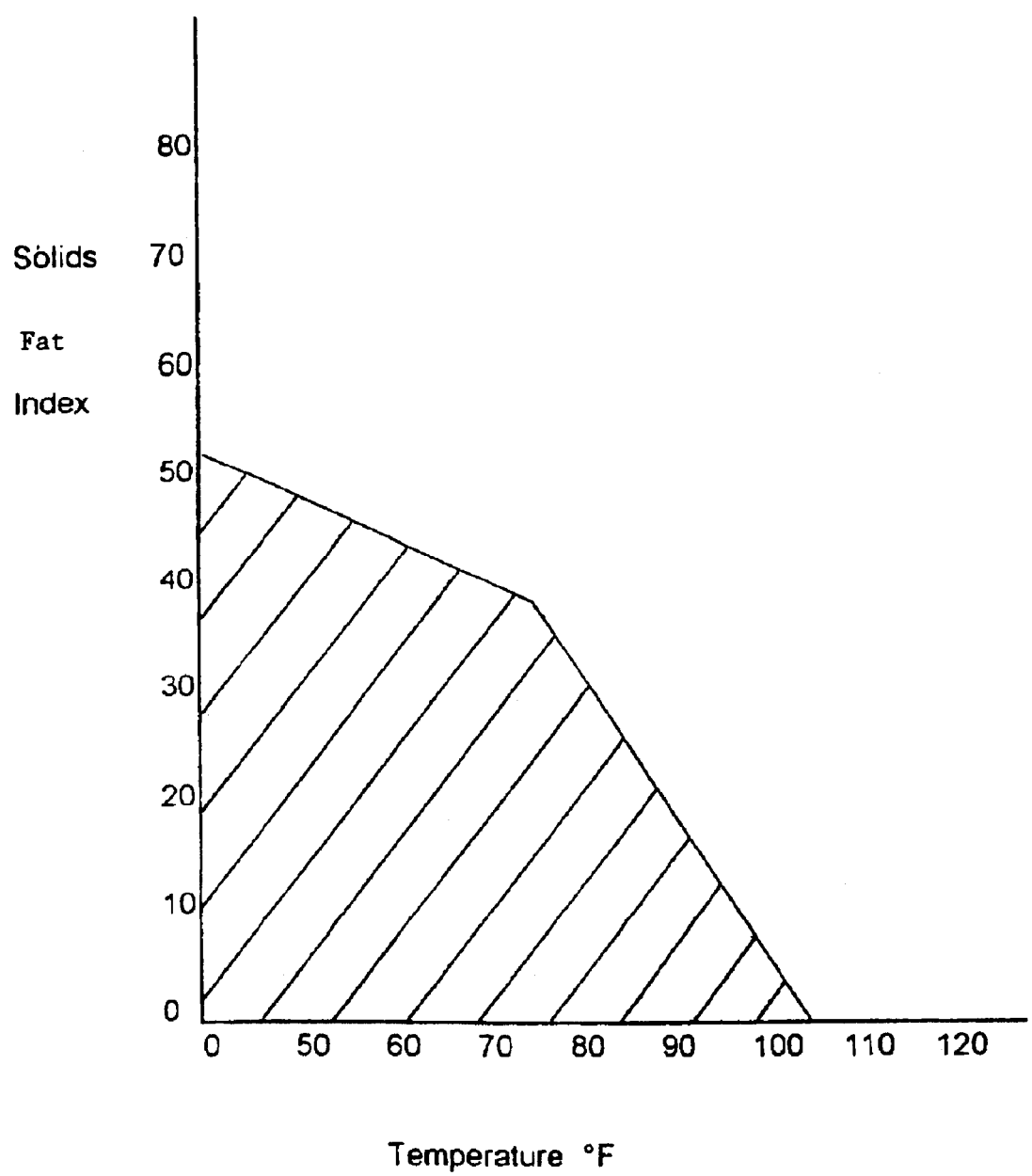
FIG. 10 is graph of temperature with respect to the Solids Fat Index of a mixture of triglycerides and showing the various solids and liquid content of the mixture at different temperatures and showing the agglomeration boundary for such mixtures.
Figure 11:
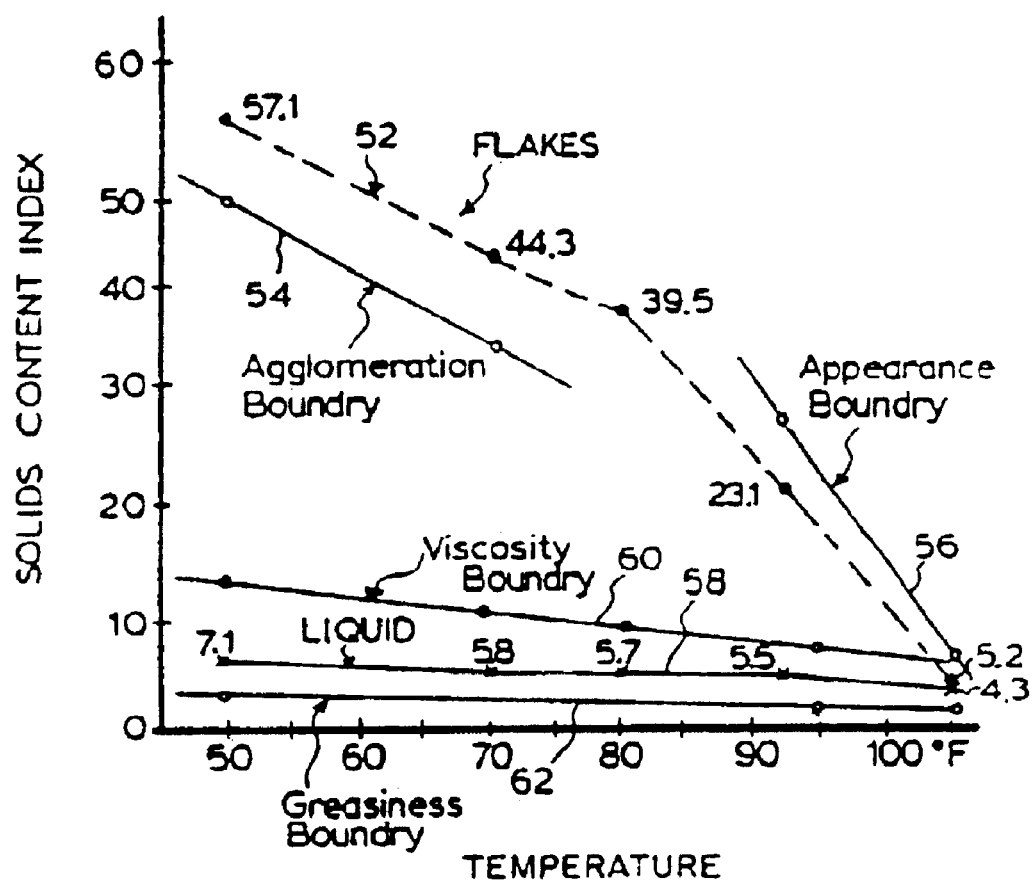
FIG. 11 is a reproduction of a FIG. 3 found in U.S. Pat. No. 4,891,233 to Belanger et al. and showing a form of a solids fat indes curve produced by nuclear magnetic resonance and denominated a Solids Content Index Curve.

Referring now to FIG. 9, another embodiment of the invention is shown having dual scrapers 34a, 34b and dual dispensers 32a, 32b on a single carrier 28 and dual conveyors 39a, 39b at either end.. This embodiment permits layer 47 of a mixture to be dispensed onto work surface 13 while the scraping function is conducted upon a previously dispensed layer to produce flakes 35. In FIG. 9, the embodiment is shown scraping flakes 35 into void 17 for movement by conveyer 39. After an appropriate interval of time to allow sufficient solidification, scraper 34a will be lowered and carrier 28 will be moved toward end 14 to scrape off layer 47.

An operation cycle of the invention will now be described beginning when carriage 28 is positioned at limit switch 63. In this position switch 63 has been pushed in the directed of plate 14 by the movement of carriage 28 toward plate 14. This movement of switch 63 stops the movement of carriage 28 toward plate 14 and reverses the direction of operation of motor 20 and lowers scraper 34 (FIG. 1) to contact to work surface 13 and starts a timer for a timing interval. At the conclusion of the timing interval the timer activates motor 20 to send carriage 28 toward plate 16. During this movement toward plate 16, carriage 28 activates limit switch 62 to cause the opening of valve 30 to turn-on the flow of liquid from dispenser 32. Carriage 28 continues toward plate 16 and activates limit switch 65 to close valve 30 and turn-off the flow of the liquid from dispenser 32. Carriage 28 continues until it contacts limit switch 60 which stops the carriage, raises scraper 34 and activates a timer. At the end of the timing interval motor 20 is activated in the reverse direction. In the reverse direction, limit switch 62 is reset to its initial position so it can again active the flow of liquid on the return trip of carriage 28 toward plate 16.

Formation of Coated Flaked Fats Using Fat Mixtures Having and SFI Profile Below the Agglomeration Boundary The patent to Haywood (GB 2,176,143) describes a process to flake a cooking fat solid in block form. For example, margarine, butter or lard. The second aspect of the invention is a dispenser adapted to keep the contents at a substantially constant temperature. Such a dispenser could be kept at a cool temperature such as with cake making or roasting, but in other cases, it is preferred that the granules or flakes are kept frozen by keeping the product in refrigeration (approximately 35° F.) or in a freezer (approximately 0° F.).

In U.S. Pat. No. 6,312,752, Column 1, lines 41–55, the Haywood patent is discussed. Lard, butter and margarine are fats that are below the agglomeration line (reference to FIG. with solids content index). Haywood suggests that to maintain flakes, they must be stored at temperatures at or below refrigerator temperatures (below 35° F.) for cooking purposes.

U.S. Pat. No. 6,312,752 points out that these flakes are used for cooking purposes and not as an ingredient for the preparation of bakery products. The problems with the Haywood teachings are as follows:

1. The flakes must be stored in a special insulated container to prevent a temperature rise that would cause agglomeration and loss of flowability.
2. A special insulated container would be expensive for use in commercial applications.
3. Butter and margarine are water and oil emulsions. Freezing of these products will cause the emulsions to break down, and when the product is added to a pastry-type product, the water will separate from the fat and will give less than desirable results.
4. In industrial uses, even though the product is stored in refrigeration most of the time, the product must be able to withstand shipping and handling abuses. These flakes are untreated (or protected to prevent agglomeration). If this product is raised to room temperature, for an extended period and then refrozen, these flakes will agglomerate into clumps which is unacceptable in making pastry or flaky bakery products.

In the production of the present invention, we coat our flakes for the following reasons:

1. To prevent clumping and agglomeration and to have flowability under preferred use temperatures. Even if the flaked fat is soft at use temperature and flowable, desirable products can be made. The flakes must have individual integrity when added to a mixer during the preparation of a bakery product. The flakes can be added in the "Scottish method" or the "Blitz method" as described in Doerry, Wolf T., *Laminated Dough Systems*, The American Institute of Baking, Manhattan, Kans., Page 12.
2. The products under the agglomeration curve are generally soft because of the amount of liquid fat still present after a flake is made. Unless the flake is kept at a low temperature as described in Haywood, the surface of the flake may be greasy and cause adhesion between the flakes causing a loss of flow even if the flakes have individual flake structural integrity. The coating that is applied in the present invention prevents the individual flakes from adhering to adjacent flakes.
3. In industrial baking applications, the flakes must not agglomerate during temperature fluctuations normally caused during shipping, storage and handling.

Pilot plant trials were completed on a prototype production machine as shown in FIG. 7. The plate was 24 inches wide and 70 inches long. A retractable scraper blade and liquid applicator traveled the length of the horizontal flat cooling plate between micro switches 60 and 63. The liquid applicator for the test was a fan pattern liquid spray nozzle. The liquid mass flow was controlled with a variable speed pump and an adjustable flow control valve. The speed of the carriage was controlled by an adjustable frequency controller. Ammonia refrigeration was circulated through voids in the cooling plate to maintain low temperatures and to provide a method to rapidly cool the product.

Pilot plant trials were done on the products listed in Table 1. The SFI specification and melting points are listed. Other than items 10, (104° F. m.p. flaking shortening) and item 16 (114° F. m.p. flake shortenings). The items are shortenings that are not commercially flaked with belt or drum flakers. Item 10 is a product, that when flaked on a roller, is held seven to fourteen days in a 40° F. storage to prevent agglomeration. Even when the product is stored at 40° F. the product internal temperature will rise due to the continuing crystallization of the fat. Generally, it takes ten to fourteen days of storage to remove the heat of crystallization and bring the entire mass to a temperature below 50° F.

It is known in the baking industry that fat chips or flaked fat shortenings are added at the mixture at temperatures below 50° F. This is performed so the chips are ridged and so the chips maintain their flake structure integrity during mixing, and so that if there is a significant increase in dough temperature caused by the friction of mixing, the flakes will not melt.

In Table I are shown oils, fats and fat and oil mixtures that are not traditionally flaked because of the following reasons:

1. The products are soft when flaked even when stored at low temperatures.
2. The products tend to agglomerate after flaking because of the heat generated by continuing crystallization.

3. Even when the flakes are properly cooled and stored at temperatures that prevent agglomeration, if raised to a higher temperature, the flakes will agglomerate and lose individual flake integrity and become a mass of material therefore, eliminating flowability which is needed for adding the product into mixers.
4. Traditional roller and belt flakers do not remove enough heat to cause the fat to flake on the surface of the roller or belt flakers in an economically suitable operation.

TABLE I

Description of Shortenings Flaked on Flat Plate

| Item | Description | SFI (Degrees Fahrenheit)[2] | | | | | | Mettler Melting Point (° F.) |
|---|---|---|---|---|---|---|---|---|
| | | 50° | 70° | 80° | 92° | 100° | 104° | |
| 1 | Lard, undeoderized, 2%, 4 I.V.[1] Hydrogenated | 27 | 19 | 12 | 3 | 2 | 2 | 94 |
| 2 | Butter, salted | 32 | 12 | 7 | 2 | — | — | 89 |
| 3 | Bakers Grade Margarine: 80.3% oil, 16.8% moisture, 2.9% salt | 28 | 21 | 18 | 16 | — | 10 | 104 |
| 4 | Puff Pastry Shortening: 80.2% oil, 16.8% moisture, 1.9% salt | 34 | 30 | 29 | 22 | — | 16 | 120 |
| 5 | Pastry Shortening: 71% oil, 25% moisture, 2.0% salt, 2.0% monoglyceride | 33 | 30 | 28 | 21 | — | 15 | 119 |
| 6 | Pastry Shortening: 88% oil, 10% moisture, 1.0% salt, 1.0% monoglyceride | 33 | 30 | 28 | 21 | — | 15 | 119 |
| 7 | Pastry Shortening: 64% oil, 30% moisture, 3.0% salt, 3.0% monoglyceride | 33 | 30 | 28 | 21 | — | 15 | 119 |
| 8 | 92° m.p. Coconut Oil | 63 | 38 | 10 | 2 | 0.3 | — | |
| 9 | Frying Shortening, Vegetable | 49 | 35 | 29 | 13 | 4 | 1 | 105 |
| 10 | 104° m.p. Flaking Shortening | 59 | 46 | 39 | 19 | — | 1 | 104 |
| 11 | Pie Crust Shortening, Vegetable | 23 | 20 | 18 | 12 | — | 4 | 92 |
| 12 | All Purpose Shortening, Vegetable base | 23 | 19 | — | 14 | — | 11 | 102 |
| 13 | Appetize ® Premium Shortening Tallow/Corn oil blend | 43 | 24 | 17 | 9 | — | 3 | 107 |
| 14 | Appetize ® Bake All Purpose Shortening Tallow/Corn oil blend/mono and diglycerides | 29 | 21 | 17 | 12 | — | 5 | 105 |
| 15 | Imitation Cheeze base oil | 28 | 15 | — | 24 | — | | 95 |
| 16 | 114° m.p. Flake Shortening | 65 | 56 | 53 | 37 | — | 16 | 114 |

[1]Iodine Value
[2]American Oil Chemists' Society, Official and Tentative Methods, 3rd Ed., Recommended Practice Cd. 10–57, rev. 1974.
[3]Appetize ® is a registered trademark of Source Food Technology, Inc.

By experimentation, it was found that by holding the fat for a sufficient time on the horizontal plate flaker, all of the heat of crystallization could be removed from the fat thereby producing chips which do not rise in temperature during the storage process as is shown in FIG. 5 for fat flake chips which are produced on a rotating drum-type mechanism.

In Table II, the operating parameters for flaking the fats, listed in Table I, are given for flaking on the horizontal flat plate. All of the items could be flaked. Both the exit temperature (the temperature of the product as it is scraped from the plate) and the storage temperature after 12 hours are presented. The storage room was held at 45° F. In all cases, the rise in temperature was the result of heat in the storage room transferring into the product.

TABLE II

Operating Parameters for Flat Plate Flaker

| Item | Description | Melted Oil Run Temp (° F.) | Hold Time at Stop 2 (Sec) | Carriage Run and Stop Time | Total Hold Time (Sec) | Exit Temp (° F.) | Storage Temp. at 12 hours |
|---|---|---|---|---|---|---|---|
| 1 | Lard, undeoderized, 2%, 4 I.V. Hydrogenated | 105 | 15 | 12 | 27 | 35 | 41 |
| 2 | Butter, salted | 105 | 18 | 12 | 30 | 34 | 36 |
| 3 | Bakers Grade Margarine: 80.3% oil, 16.8% moisture, 2.9% salt | 115 | 10 | 12 | 22 | 42 | 44 |
| 4 | Puff Pastry Shortening: 80.2% oil, 16.8% moisture, 1.9% salt | 130 | 7 | 12 | 19 | 41 | 45 |
| 5 | Pastry Shortening: 71% oil, 25% moisture, 2.0% salt, 2.0% monoglyceride | 130 | 6 | 12 | 19 | 40 | 44 |
| 6 | Pastry Shortening: 88% oil, 10% moisture, 1.0% salt, 1.0% monoglyceride | 130 | 10 | 12 | 22 | 38 | 42 |

TABLE II-continued

Operating Parameters for Flat Plate Flaker

| Item | Description | Melted Oil Run Temp (° F.) | Hold Time at Stop 2 (Sec) | Carriage Run and Stop Time | Total Hold Time (Sec) | Exit Temp (° F.) | Storage Temp. at 12 hours |
|---|---|---|---|---|---|---|---|
| 7 | Pastry Shortening: 64% oil, 30% moisture, 3.0% salt, 3.0% monoglyceride | 130 | 5 | 12 | 17 | 41 | 44 |
| 8 | 92° m.p. Coconut Oil | 110 | 9 | 12 | 25 | 31 | 35 |
| 9 | Frying Shortening, Vegetable | 120 | 6 | 12 | 21 | 36 | 42 |
| 10 | 104° m.p. Flaking Shortening | 115 | 22 | 12 | 18 | 34 | 42 |
| 11 | Pie Crust Shortening | 105 | 21 | 12 | 34 | 30 | 38 |
| 12 | All Purpose Shortening, Vegetable base | 115 | 21 | 12 | 33 | 31 | 38 |
| 13 | Appetize ® Premium Shortening Tallow/Corn oil blend | 120 | 12 | 12 | 24 | 29 | 34 |
| 14 | Appetize ® Bake All Purpose Shortening Tallow/Corn oil blend | 120 | 13 | 12 | 25 | 33 | 39 |
| 15 | Imitation Cheese base oil | 105 | 26 | 12 | 38 | 29 | 37 |
| 16 | 114° m.p. Flake Shortening | 125 | 3 | 12 | 15 | 34 | 42 |

Operating Conditions:

| | |
|---|---|
| Temperature of Ammonia: | −5° to 0° F. |
| Flake Thickness: | .037–.042 inches |
| Speed of Carriage: | 1 ft./sec |
| Length of Spray Pattern | 5 feet |
| Hold Time @ Stop 1: | 2 seconds |
| Packaging | 16.5 inches × 16 inches × 12 inches box |
| Pack Weight | 50 pounds |
| Storage Room Temp. | 45° F. |

Table III lists the operating parameters to produce different thickness flakes. Again, the hold time was sufficient to eliminate both the sensible heat and the heat of fusion to produce flakes that maintained their integrity as separate flakes and maintain pourability.

TABLE III

Flaking Operating Parameters for Flat Plate Flaker

| Item | Description | Thickness (inches) | Melted Oil Run Temp (° F.) | Hold Time at Stop 2 (Sec) | Carriage Run and Stop Time | Total Hold Time (Sec) | Exit Temp (° F.) | Storage Temp. at 12 hours |
|---|---|---|---|---|---|---|---|---|
| 3 | Bakers Grade Margarine: 80.3% oil, 16.8% moisture, 2.9% salt | .040 | 115 | 10 | 12 | 22 | 42 | 44 |
| 3 | Bakers Grade Margarine: 80.3% oil, 16.8% moisture, 2.9% salt | .080 | 115 | 28 | 22 | 50 | 40 | 43 |
| 3 | Bakers Grade Margarine: 80.3% oil, 16.8% moisture, 2.9% salt | .125 | 115 | 38 | 35 | 73 | 39 | 43 |
| 9 | Frying Shortening, Vegetable | .040 | 120 | 9 | 12 | 21 | 36 | 42 |
| 9 | Frying Shortening, Vegetable | .080 | 120 | 21 | 22 | 43 | 39 | 44 |
| 12 | All Purpose Shortening, Vegetable base | .040 | 115 | 21 | 12 | 33 | 31 | 38 |
| 12 | All Purpose Shortening, Vegetable base | .125 | 115 | 73 | 35 | 108 | 28 | 37 |

Operating Conditions:

| | |
|---|---|
| Temperature of Ammonia: | −5° to 0° F. |
| Flake Thickness: | Variable |
| Speed of Carriage: | Variable |
| Hold Time @ Stop 1: | 2 seconds |
| Packaging | 13.5 inches × 16 inches × 12 inches - box with bag |
| Pack Weight | 50 pounds |
| Storage Room Temp. | 45° F. |

To simulate shipping, storage and distribution fluctuations, storage tests were conducted on different items from Table I. A coating of ground hard fat was added at the levels of 2.5 percent to 7.5 percent by weight to the selected items and compared against an uncoated control in each case. The products were run with the same parameters as identified in Table II and then held for 48 hours at 45° F. The product was filled into 6.5 inch by 6.5 inch by 12 inch high carton boxes. Ten point five pounds of flakes were filled into each carton box.

Three boxes were prepared for each item. After the initial storage, one box of each item was stored at 70° F., 85° F. and 100° F. for 24 hours. After the 24 hours, the boxes were returned to the 45° F. storage room for 24 hours to return the mass to the original 45° F. temperature. After the third storage, the entire contents of the box were dumped into a tray and gently raked with a fork. All agglomerated or clumped flakes were weighed. In Table 4, the results are listed. From the results, it is evident that coating the product reduces or eliminates agglomeration during storage at different temperatures.

The preferred coating was a ground vegetable fat with a Mettler Drop Point of 136°–160° F. and an Iodine Value (wijs) of five maximum. For flakes that are stored at temperatures below 70° F., a coating comprising a fat (animal or vegetable) with a Mettler Drop Point melting point of at least 120° F. and SFI profile above 75 percent, 74 percent, 70 percent, 65 percent, 45 percent at 50° F., 70° F., 80° F., 92° F. and 104° F. respectively. The preferred method was to add a granulated fat. A second method would be to add first a thin layer of hard fat, followed by a second, thicker layer of regular fat, and a final layer of hard fat. All three layers are liquid and sprayed onto the horizontal flat plate flaker. All the items in Table 1 are below the agglomeration line with the exception of items 10 and 16.

Under normal commercial practices, butter, table-grade margarine, baker's margarine, puff pastry margarines and hydrous pastry shortenings are stored at 40° F. to 65° F. These items when added by either the Scottish or Blitz methods are added at 40° F. to 60° F. for best results. These items are used in making puff pastry, and the Danish-type high fat bakery products.

These hydrous shortening products are the following composition:

0.5–7.5% coating fat by weight of hydrous shortening hydrous shortening

60–90% fat (animal or vegetable)

10%–30% water, or milk and/or milk products

0–3% salt

0–3% emulsifiers suitable for water and oil emulsions

0–5% suitable edible protein, including, but not limited to liquid, condensed or dry form of whey, whey modified by the reduction of lactose and/or minerals (see attached standard of identity of margarine).

Baking trials were conducted on Items 3, 4, 5, 6 and 7 that were flaked with an average thickness 0.46 inch using the parameters in Table II. All five items were coated with the granulated fat at a level of 3 percent. All five items were stored for 48 hours in a 45° F. storage room, and then transferred to a 85° F. storage room for 24 hours. The product was then transferred to the 45° F. storage room for 24 hours. In all cases, 10.5 lbs. was filled into a 1.5 inch by 6.5 inch square, 12 inch high carton box. From all five samples, a puff pastry product was produced using the following formula and procedure:

Puff Pastry—Scotch Method

A. Dough

|  | Baker's % | Weight/lbs. |
|---|---|---|
| Flour (7.12.5% protein) | 100 | 5 |
| Pastry Shortening (chill to 26°–40°) | 80 | 4 |
| Ice Water (52° F.) | 55 | 2.75 |
| Salt | 1 | .05 |
| Cream of Tartar | 0.75 | 0.38 |

B. Mixing Procedures

1. Use a vertical mixer, Hobart 20 quart bowl and spiral and spiral hook.
2. Blend flour and flake pastry shortening about 20 seconds on 1st speed.
3. Add the salt and acid to the water and dissolve and add to the bowl.
4. Mix on 1st speed until ingredients come together.

C. Make-up

1. Rest the dough for 20 minutes before make up.
2. (a) Half of the dough folded and laminated in a 4–3–4 folding series and sheeted to 0.125 inch thickness. (b) Half of the dough is not folded and immediately sheeted to a 0.125 inch thickness.
3. The sheeted dough were cut into 4 inch by 6 inch rectangles and docked with a docking roller.

D. Baking

1. The made-up rectangles were allowed to rest for 10 minutes on a baking pan.
2. The product was baked at 400° F. until golden brown.
3. After rolling, the product was cut in half and examined for volume and flakiness.

For all five items, the resulting baked products had increased volume and flakiness. Generally, the volumes were less than products produced using the "English Method" with more laminations, however, the product was comparable to products produced in high speed operation. In all cases, the product made with the higher percentage of moisture had a greater volume. The advantage of adding a flaked butter, margarine and/or pastry shortening is as follows:

1. Eliminated the need to cut the solid shortening into small cubes first before the pastry shortening is added in the "Scottish Method" or "Blitz Method."
2. By being able to add the flakes directly to the mixer rather than by manual methods which involve sheeting of the dough into a rectangular shape and spreading the pastry fat uniformly over the area then folding as with the English Method, and similar "French Method," much labor intensive work is avoided.
3. In commercial bakeries that are automated the pastry fat is either co-extruded on the inside of a hollow tube of extruded dough or deposited as a continuous layer of fat on top of a continuous layer of dough which is then covered with a second layer of dough. The equipment used in these operations are very expensive and add to the cost of manufacturing.
4. In the automated systems, the dough and fat added volumetrically and if there are changes in the specific gravity of either the dough or the fat, the proper ratio of fat to dough will vary. By adding flaked fat by weight with other weighed ingredients at the mixer, there are no variations in the fat to dough ratio.

In Belanger, et al. (U.S. Pat. No. 4,891,233), a novel solids fat index is provided to prepare flakes of fat which are particular suited to making of pie crust dough and ensure a consistent quality of pie crust. FIG. 3 shows the preferred SFI value profile. The preferred composition is shown in dotted line 52 and identified by the term flake. A deviation from the dotted line 52 may be accommodated in providing a range of SFI value for suitable fat composition. A lower boundary is determined by line 54 which is defined as the agglomeration boundary. The agglomeration boundary 54 is determined by a SFI profile that:

1. Avoids the flakes of fat agglomerating together during storage and losing their identity.
2. Provides flakes which are sufficiently malleable such that incorporated into the baking ingredients at room temperature.
3. When flakes of fat are produced on rollers or cooling belts, flakes below the agglomeration have a tendency to congeal and in some instances lose their identity and form lumps of fat which cannot be broken up and cannot be used in making of pastry dough.

4. The flakes must be capable of being stored at temperatures in the range of 80° F. to 100° F. without congealing together and cannot be broken up into free flowing chips.

The product described by Belanger, et al. is very similar to Item 10. If this product is subject to temperature extremes (80° F. to 100° F.), this product will maintain its flowability, however, produced below the agglomeration boundary if uncoated will congeal and clump. However, in the commercial baking industry, Items 1 (lard), Item 11 (pie crust shortening), Item 12 (all purpose vegetable shortening) and Item 4 (animal/vegetable blended all purpose shortening) are preferred in the manufacture of pie crust. The shortening content of the pie crust will range from about 40% to 100% based on the flour weight. The best pie dough, considering both its character and makeup processing, is obtained with a shortening that is workable over a wide temperature range. It should be firm but not brittle and retain its plastic texture between 55° F. to 90° F. (12.8° to 32.3° C.). Pure lard, when refrigerated, is one of the most plastic shortenings available; however, it does experience extreme softness at a temperature above 80° F. Most hydrogenated shortenings have a relatively short plastic range and are objectionable because of a slight bitterness that may develop in them when they are refrigerated. Such shortenings can be used satisfactorily in a pie crust at temperatures ranging between 65° F. and 85° F. Both lard and vegetable shortenings of superior plasticity are available in solid plastic shortening packaged in 50 pound containers. In commercial baking applications, the plastic shortenings may be added as follows:

1. Manually—The carton box is stripped and the plastic bag is removed and the shortening is dumped into the mixer.
2. Semi-Automatic—In high speed mixing operations, the carton box and plastic bag are removed first, the cube of shortening is placed on a conveyor which fees the cubes rapidly into the mixer when called for.
3. Automatic—The fat is in a molten state and pumped either volumetrical or weight control directly to mixer.

In case 1 and 2, the shortening is chilled to below 50° F. in order to increase the ease of handling and compensate for heat generated during mixing.

In most commercial applications, the mixing operation is a two stage operation; first stage the fat is blended with the flour, second state, water and dissolvable are then added and the dough is brought together. To produce a flaky-type crust, add the shortening and all the flour are blended in the mixer until the shortening particles are reduced to approximately the size of small balls of marbles. The temperature of both shortening and flour should be between 50° F. and 60° F. to achieve the desired results. The solids are dissolved in the cold water and ingredients mixed only sufficient to bring the dough together. The advantage of this method is that the baked crust colors well, is crisp and flaky, and has good eye appeal. Its drawbacks are that it requires great care in mixing and controlling temperature. There are several problems using solid cubed shortening and molten fat in producing a flaky-type crust. The problems are as follows:

1. If the cubes of solid shortening are cooled below 50° F., the inner bag fold will be trapped inside the solid shortening, the bags will tear and contaminate the dough. If extreme caution is taken, extra labor must be used. Bag contamination is a serious problem in commercial operations.
2. In high speed mixing or regular mixing, the chilled, hard shortening is hard to disperse and requires longer mixing time which results in a mealy pie crust or over development.
3. If the chilled, hard shortening is not properly mixed. Large balls result causing holes in the sheeted crust when baked.
4. When molten fat is used, the fat coats the flour giving a mealy product. If extreme care is taken in mixing by controlling mixing speed and temperature of flour and dough temperature balls of fat/flour can be produced but a smaller percentage of the mix.
5. The solid shortening must be pre-chilled before use.

The advantage of having the shortening in a coated, flaked form is as follows:

1. The coated flake is manufactured, stored and shipped at the temperature (below 50° F.) required for manufacture.
2. The coated flake will not clump or agglomerate if the shortening is mishandled during handling, distribution and storage. When it is returned to the proper temperature, it can be used.
3. The coated flaked fat can be easily added to the mixer because of its flowability. There will be no bag contamination because the flakes easily flow from the bag without tearing it.
4. The mix time required to disperse the shortening decreases because the coated flakes consist of small particles when compared to a 50 pound block of hard, cold solid shortening. It takes less energy and time to develop the proper sized fat/flour balls.
5. Less heat is generated causing the dough temperature to raise.

Baking trials were conducted in Item 1 (lard), item 2 (pie crust shortening), Item 12 (vegetable all purpose shortening), and item 14 (animal/vegetable blended all purpose shortening) that had an average thickness of 040 inches using the parameters in Table II. All items were coated with a granulated fat at a level of 5%. Pie crust was produced using the following formula and procedure for all four items.

Pie Crust for Pot Pie

1. Formula

| a. First Stage | flour | 100% | 5 lbs. |
|---|---|---|---|
| | Coated, Flaked shortening | 80% | 4 lbs. |
| b. Second Stage | Water | 32% | 1.5 lbs. |
| | Salt | 2% | 1 lbs. |
| c. The bottom crust was filled with a meat | | | |
| | HGCS | 4% | .2 lbs. |
| | NFDM | 4% | .2 lbs. |

Note:
the flour and coated flakes were chilled to 40° to 50° F.

2. Mixing—20 qt. Hobart Vertical Mixer
    a. First Stage—The flour and coated flakes were added to the mixer. The ingredients were mixed until small ball of fat/flour were formed.
    b. Second Stage—The salt, HFCS and NFDM were dissolved in the cold water. Once completely dissolved, the water phase was added to the mixer. The dough was mixed to the point that the ingredients came together. Note: Water temperature must be adjusted so the finished dough is about 50° F.

c. The dough is rested for 20 minutes before sheeting.

3. Sheeting and Make-up a. The dough was sheeted in two directions to a thickness of 0.125 inches.

b. Top crust was made without any rework. The bottom crusts had 0–40% rework.

c. The bottom crust was pressed into the pie pan.

d. The bottom crust was filled with a meat, vegetable, and gravy slurry.

e. The top crust was applied and the outer edge was pressed into the bottom crust edge.

f. The pies were frozen for 24 hours at 0° F. and kept in frozen storage until baked.

4. The pies were baked at 415° F. for 20–30 minutes, allowed to be cooled to 90° F. and evaluated for flakiness, color, and flavor.

All four coated-flaked shortenings produced the desired flakiness and color. The pies produced with the coated flaked lard and animal/vegetable blended shortening had the best flavor and color.

Non-hydroscopic Coating Materials

Edible fats and/or oils, or mixture of these, having the minimum Mettler Drop Melting point of 120° F. and a SFI profile above the agglomeration boundry defined, and they may contain amounts emulsifiers such as mono- and diglycerides, lecithin, lactylated monoglycerides, calcium and sodium steareroyl lactylate, propylene glycol esters, diacetyl tartaric monoglycerides, ethoxylated monoglycerides, sorbitan monostearate, polysorbate, polyglycerol esters, succinylated monoglycerides, sodium stearoyl fumerate, sucrose esters, stearoyl lactylate, etc. and antioxidants such as THQ, BHA, BHT, propylgallate, etc. and may be combined with citric, phosphoric thiodipropionic, ascorbic, and tartaric acids, etc. and flavors such as diacetyl, fat soluble natural and synthetic of fruits and vegetables, and color additives such as beta carotene, annatto, etc. Also coatings such as emulsifier and/or mixture of these having the minimum Mettlee Drop Melting point of 120° F.

Hydropscopic Coating Materials

A hydroscopic coating can be one or more in combinations of edible, dry protein such as non-lactose containing whey components, albumin, casein, vegetable proteins, soy protein, isolated wheat protein, gluten, etc., and sugars such as sucrose, maltose, dextrose, etc., flours such as wheat, rye, soy, etc., starchs (natural and modified), corn syrup solids, gums such as gum arabic, etc., hydrocolloids, fibres, butter milk powers, skimmed milk powers, whey powder, cellulose, and silicas and minerals, ethycellulose.

Coating Process

To achieve a coated fat flake, the coating material is selected on the basis of the moisture content of the fat flake product. Products have a substantial moisture content such as butter should be coated with a non-hygroscopic coating material to avoid the removal of moisture from the product. Products have little moisture content can be coated with a hygroscopic coating material as the little, if any, moisture added to the coating from the product will not harm the coatings ability to function.

In operation, the application of the coating may be achieved two ways. If the coating selected is a substance, such as a hard waxy fat with a melting point above 120° F., the material can be melted and sprayed onto the work surface of the flat flate flaker. The coating can be on one or both sides of the fat mixture which has an SFI below the Agglomeration Boundary. If the coating selected is a substance, is a solid the material can be applied to the work surface of the flat flate flaker using the solids applicator device. The coating can be on one or both sides of the fat mixture which has an SFI below the Agglomeration Boundary.

In Table IV the results of storage of coated and uncoated products is shown.

TABLE IV

Storage Tests - Coated Product vs. Uncoated Product

| Item | Description | Coating % by Wt. | Agglomeration % by Weight and by Storage Temperature | | |
|---|---|---|---|---|---|
| | | | 70° F. | 85° F. | 100° F. |
| 1.1 | Lard | 0 | 32 | 65 | 84 |
| 1.2 | Lard | 2.5 | 6 | 17 | 30 |
| 1.3 | Lard | 5.0 | 0 | 3 | 12 |
| 2.1 | Butter | 0 | 48 | 72 | 100 |
| 2.2 | Butter | 5.0 | 0 | 7 | 11 |
| 3.1 | Bakers Grade Margerine | 0 | 28 | 52 | 83 |
| 3.2 | Bakers Grade Margerine | 3 | 2 | 15 | 22 |
| 4.1 | Pastry Shortening | 0 | 24 | 48 | 66 |
| 4.2 | Pastry Shortening | 3 | 0 | 8 | 18 |
| 9.1 | Frying Shortening, Vegetable | 0 | 27 | 59 | 64 |
| 9.2 | Frying Shortening, Vegetable | 5 | 0 | 4 | 6 |
| 12.1 | All Purpose Shortening, Vegetable base | 0 | 48 | 63 | 73 |
| 12.2 | All Purpose Shortening, Vegetable base | 5 | 7 | 21 | 32 |
| 12.3 | All Purpose Shortening, Vegetable base | 7.5 | 2 | 8 | 12 |

Procedural Conditions:

1. Initial Settings:

Temperature 45°
 Storage Time 48 Hours

TABLE IV-continued

Storage Tests - Coated Product vs. Uncoated Product

| Item Description | Coating % by Wt. | Agglomeration % by Weight and by Storage Temperature | | |
|---|---|---|---|---|
| | | 70° F. | 85° F. | 100° F. |
| 2. Second Storage | | | | |
| Test 1 - 70° F. for 24 hours | | | | |
| Test 2 - 85° F. for 24 hours | | | | |
| Test 3 - 100° F. for 24 hours | | | | |
| 3. Third Storage | | | | |
| Temperature 45° | | | | |
| Storage Time 24 Hours | | | | |
| 4. Test Conditions | | | | |
| Room Temperature - 45° | | | | |
| Flake Thickness - .037–.042 inches | | | | |

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Certain changes may be made in embodying the above invention, and in the construction thereof, without departing from the spirit and scope of the invention. It is intended that all matter contained in the above description and shown in the accompanying drawings shall be interpreted as illustrative and not meant in a limiting sense.

Having now described the features, discoveries and principles of the invention, the manner in which the inventive Plate Flaker is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

Having thus described the invention, what is claimed as new and desired to be secured by Letters Patent is as follows:

1. A method of forming a coated, flaked fat from a liquid mixture comprising a fat said liquid mixture having a solids fat index below the Agglomeration Boundary comprising:
    selecting a liquid mixture comprising a fat, said mixture having a solids fat index below the Agglomeration Boundary,
    adjusting a generally horizontal flat plate work surface to a temperature sufficient to change the liquid mixture into a solid,
    dispensing a layer of the liquid mixture onto said work surface,
    allowing the solid to form from the liquid mixture,
    dispensing a preexisting solid onto said formed solid, and
    scraping the formed solid from said work surface.

2. The method as claimed in claim 1 where said preexisting solid is a hygroscopic food grade material.

3. The method as claimed in claim 1 where said preexisting solid is a non-hygroscopic food grade material.

4. A method of forming a coated, flaked fat from a liquid mixture comprising a fat said liquid mixture having a solids fat index below the Agglomeration Boundary comprising:
    selecting a liquid mixture comprising a fat, said mixture having a solids fat index below the Agglomeration Boundary,
    adjusting a generally horizontal flat plate work surface to a temperature sufficient to change the liquid mixture into a solid,
    dispensing a first layer of a preexisting solid onto said work surface,
    dispensing a layer of the liquid mixture onto said dispensed preexisting solid first layer,
    allowing a solid to form from the liquid mixture, and
    dispensing a second layer of a preexisting solid onto said formed solid.

5. The method as claimed in claim 4 where said preexisting solid is a hygroscopic food grade material.

6. The method as claimed in claim 4 where said preexisting solid is a non-hygroscopic food grade material.

7. A method of forming a coated, flaked fat from a liquid mixture comprising a fat said liquid mixture having a solids fat index below the Agglomeration Boundary comprising:
    selecting a liquid mixture comprising a fat, said mixture having a solids fat index below the Agglomeration Boundary,
    adjusting a generally horizontal flat plate work surface to a temperature sufficient to change the liquid mixture into a solid,
    dispensing a layer of a second fat onto said work surface, said second fat having a melting point of greater than 120° F.
    allowing said second fat to form the solid phase of said second fat,
    dispensing a layer of the liquid mixture onto said dispensed solid second fat, and
    allowing a solid to form from the liquid mixture.

8. The method as claimed in claim 7 where said second fat has a solids fat index profile above the Agglomeration Boundary.

9. A method of forming a coated, flaked fat from a liquid mixture comprising a fat said liquid mixture having a solids fat index below the Agglomeration Boundary comprising:

selecting a liquid mixture comprising a fat, said mixture having a solids fat index below the Agglomeration Boundary, adjusting a generally horizontal flat plate work surface to a temperature sufficient to change the liquid mixture into a solid, dispensing a first layer of a second fat onto said work surface, said second fat having a melting point of greater than 120° F., allowing said second fat to form the solid phase of said second fat, dispensing a layer of the liquid mixture onto said dispensed solid second fat, allowing a solid to form from the liquid mixture, dispensing a second layer of said second fat onto said work surface, and allowing said second layer of said second fat to form the solid phase of said second fat.

10. The method as claimed in claim 9 where said second layer comprises a third fat.

11. The method as claimed in claim 9 where said fats of said second fat layers have a solids fat index profile above the Agglomeration Boundary.

* * * * *